United States Patent
Yagi et al.

(10) Patent No.: US 6,603,865 B1
(45) Date of Patent: Aug. 5, 2003

(54) SYSTEM FOR OPTICALLY PERFORMING POSITION DETECTION AND DATA COMMUNICATION

(75) Inventors: Tohru Yagi, Nagoya (JP); Yoshiaki Kuno, Tokyo (JP); Shin Suzuki, Hamamatsu (JP); Yoshiki Uchikawa, Nagoya (JP)

(73) Assignee: President of Nagoya University, Nagoya (JP)

( * ) Notice: Subject to any disclaimer, the term of this patent is extended or adjusted under 35 U.S.C. 154(b) by 573 days.

(21) Appl. No.: 09/614,732

(22) Filed: Jul. 12, 2000

(51) Int. Cl.[7] ................................................. G06K 9/00
(52) U.S. Cl. ....................................... 382/103; 359/154
(58) Field of Search ................................. 382/103, 107; 250/559.29, 559.31, 206.1, 206.2, 208.6, 330, 332, 495.1; 348/94; 356/622, 623; 33/77; 345/166, 175, 697, 7; 359/109, 143, 144, 148, 154, 181, 184, 198, 204

(56) References Cited

U.S. PATENT DOCUMENTS

| 4,309,758 A | * | 1/1982 | Halasall et al. ............... 701/23 |
| 4,626,995 A | * | 12/1986 | Lofgren et al. ............... 701/24 |
| 4,647,784 A | * | 3/1987 | Stephens ................. 250/559.3 |
| 4,882,694 A | * | 11/1989 | Brbaker et al. ................ 701/28 |
| 5,276,655 A | * | 1/1994 | Rialan et al. .................. 367/77 |
| 5,831,260 A | * | 11/1998 | Hansen ....................... 250/221 |
| RE36,530 E | * | 1/2000 | Heller et al. ................ 359/155 |

FOREIGN PATENT DOCUMENTS

| JP | 58-208606 | 12/1983 | ............ G01B/11/24 |
| JP | 60-52703 | 3/1985 | ............ G01B/11/00 |
| JP | 61-288829 | 12/1986 | ............ A61B/5/00 |
| JP | 2-183103 | 7/1990 | ............ G01B/11/00 |
| JP | 6-318913 | 11/1994 | ............ H04B/10/00 |
| JP | 7-98380 | 4/1995 | ............ G01S/17/66 |
| JP | 7-168956 | 7/1995 | ............ G07C/9/00 |

* cited by examiner

Primary Examiner—Andrew W. Johns
Assistant Examiner—Shervin Nakhjavan
(74) Attorney, Agent, or Firm—Oblon, Spivak, McClelland, Maier & Neustadt, P.C.

(57) ABSTRACT

In a system for optically performing position detection and data communication, a transmitting apparatus has first and second light-emitting elements for position indication and data transmission. An image sensing element in a receiving apparatus senses the light-emitting elements. Position is detected from the sensed image of the first light-emitting elements using triangulation, and data communication is performed by blinking the second light-emitting element. This system is used in a hospital where the use of radio waves is restricted or outerspace where the system is exposed to strong electromagnetic waves.

20 Claims, 18 Drawing Sheets

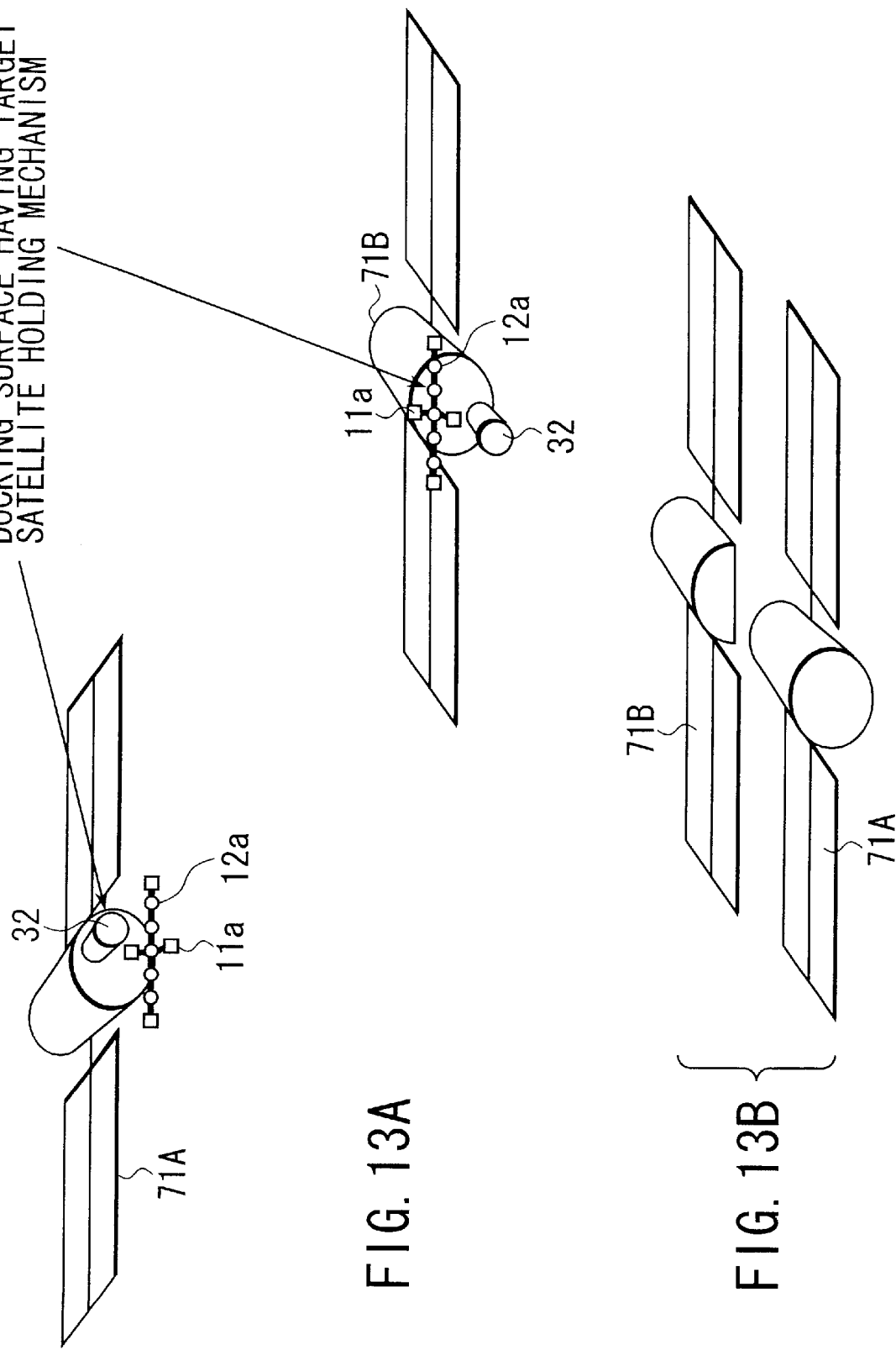

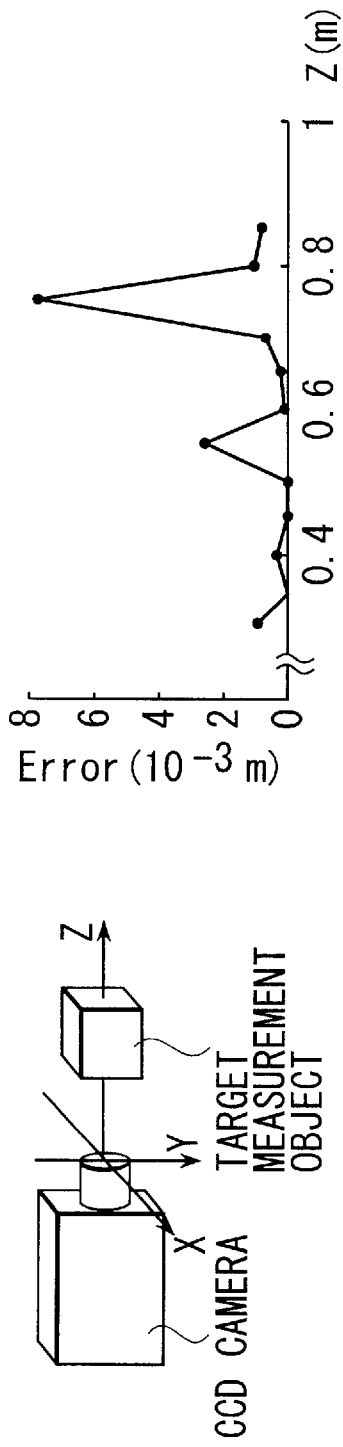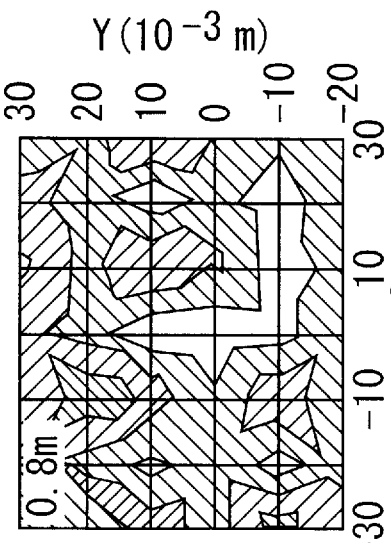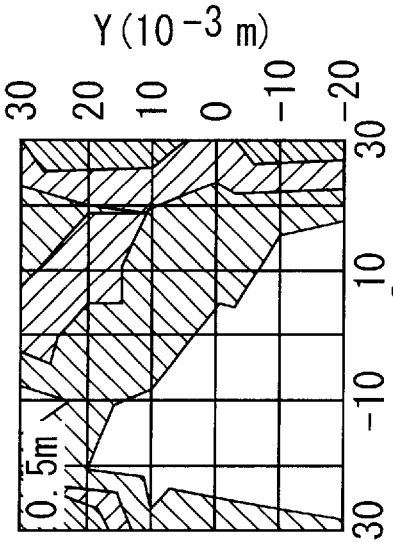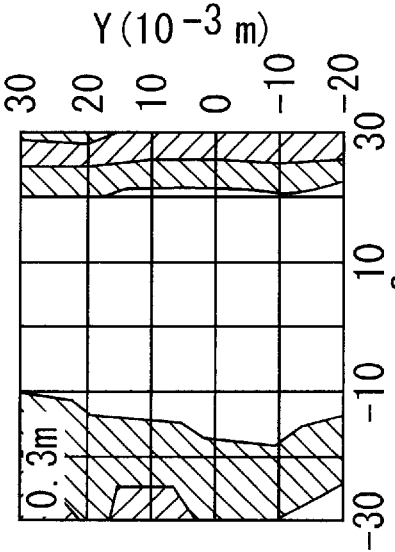

SYSTEM FOR OPTICALLY PERFORMING POSITION DETECTION AND DATA COMMUNICATION

CROSS-REFERENCE TO RELATED APPLICATIONS

This application is based upon and claims the benefit of priority from the prior Japanese Patent Application No. 2000-018704, filed Jan. 27, 2000, the entire contents of which are incorporated herein by reference.

BACKGROUND OF THE INVENTION

The present invention relates to a system for optically performing position detection and data communication.

In recent years, systems for performing position detection and data communication for an object are used in various scenes. Examples of such systems are a PHS (Personal Handyphone System) used for voice communication position search and voice communication, a VICS (Vehicle Information Communication System)-compatible car navigation system for detecting a vehicle position and receiving traffic information, and a mobile robot communication system used for position detection (PD) and data communication (DC) for a partner robot. Table 1 shows conventional system examples of this type.

TABLE 1

| System example | PD | DC |
|---|---|---|
| PHS (Voice communication search and voice communication) | Radio wave | Radio wave |
| VICS-compatible car navigation (Position detection and traffic information reception) | Radio wave | Radio wave |
| Mobile robot communication (Position detection of partner and data communication) | Image (light) | Radio wave |

These conventional systems use "radio waves" for position detection and data communication. Use of the systems is inhibited in hospitals which restrict the use of radio waves. Use of the system is also limited in the outerspace where they are exposed to strong electromagnetic waves.

A technique exclusively used for only position detection without using any radio wave has been developed. More specifically, a plurality of light sources are attached to a target position detection object, and the object is sensed with an image sensor. On the basis of the light point, coordinates of the sensed image, the position or motion of the object is detected using triangulation.

This technique is widely used in the field of image measurement including motion capture. However, this technique is inherently different from the above-described PHS and VICS-compatible car navigation and therefore cannot be directly applied to a system used for position detection and data communication for an object. Additionally, in the conventional image measurement technique, the position detection accuracy is insufficient, and the position of an object that is simultaneously translating and rotating is hard to accurately detect.

Hence, demand has arisen for a technique of simultaneously performing position detection and data communication regardless of presence/absence of limitations on radio waves and sufficiently increasing the position detection accuracy.

BRIEF SUMMARY OF THE INVENTION

The present invention has been made in consideration of the above situation, and has as its object to provide a system capable of simultaneously realizing position detection and data communication independently of radio wave conditions.

The gist of the present invention is to simultaneously optically perform position detection and data communication. FIG. 18 shows the principle of a technique of simultaneously performing position detection and data communication using light. A light-emitting element for position indication and data transmission is provided in a transmitting apparatus, and an image sensing element for sensing the light emission state of the light-emitting element is provided in a receiving apparatus. The position is detected, using triangulation, from the image of the light-emitting element sensed by the image sensing element, and data communication is done by blinking the light-emitting element. A system for performing both position detection and data communication using light in this way can be used even in a hospital where the use of radio waves is restricted or outerspace where the system is exposed to strong electromagnetic waves.

According to the first aspect of the present invention, there is provided a transmitting apparatus comprising:

a support member;

a position indicating section having a plurality of first light-emitting elements supported by the support member, the first light-emitting elements being turned on to indicate a position of the transmitting apparatus; and a data transmitting section having a second light-emitting element supported by the support member, the second light-emitting element blinking in correspondence with data to transmit the data.

The transmitting apparatus may further comprise a data processing section for supplying different kinds of information to the data transmitting section as the data, and a sensor for acquiring information associated with a target measurement object and supplying the information to the data processing section as the data.

According to the second aspect of the present invention, there is provided a receiving apparatus for detecting the position of the transmitting apparatus of the first aspect and receiving the data transmitted from the transmitting apparatus, comprising:

an image sensing element for sensing the first and second light-emitting elements;

an image processing section for separately extracting image components of the first and second light-emitting elements from a sensed image obtained by the image sensing element;

a position detecting section for detecting the position of the transmitting apparatus on the basis of the image components of the first light-emitting elements extracted by the image processing section; and a data detecting section for detecting the data on the basis of the image component of the second light-emitting element extracted by the image processing section.

The receiving apparatus may further comprise an A/D (analog/digital) converter for A/D-converting the sensed image obtained by the image sensing element to form a digital image.

According to the third aspect of the present invention, there is provided a system for performing position detection and data communication, comprising the transmitting apparatus of the first aspect and the receiving apparatus of the second aspect.

This system can be used as a hospital monitoring system, a docking assist system for docking a moving body to a stationary body, or a docking assist system for docking first and second moving bodies to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13A and 13B are views showing the states of two artificial satellites before and after docking;

FIGS. 14A to 14E are views showing the form and result of an experiment related to position detection;

DETAILED DESCRIPTION OF THE INVENTION

Figure 1:
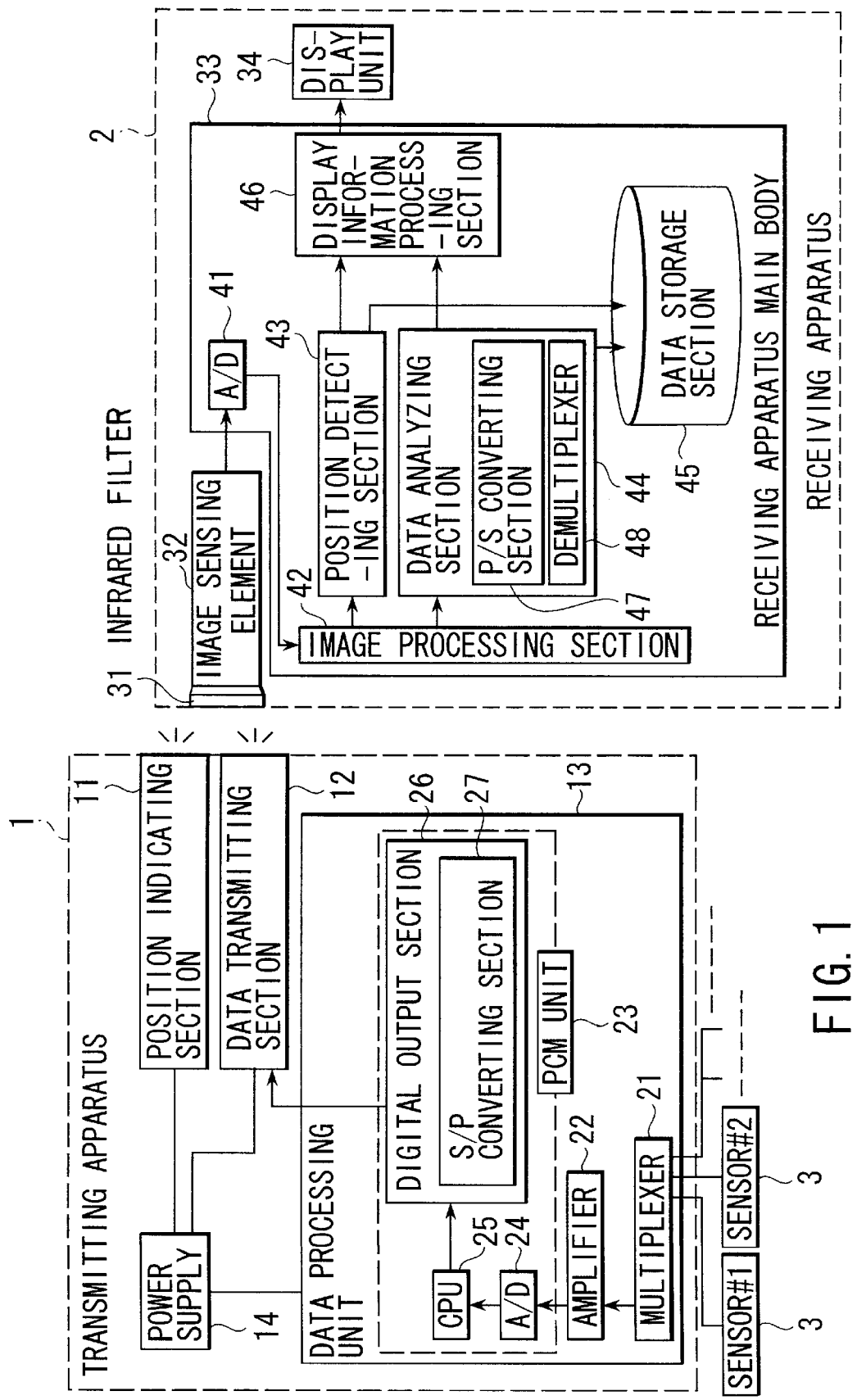
FIG. 1 is a block diagram showing the arrangement of a system according to the first embodiment of the present invention.

The embodiments of the present invention will be described below with reference to the accompanying drawings. In the following description, the same reference numerals denote constituent elements having almost the same functions and arrangements throughout the drawings, and a detailed description thereof will be made only if necessary.

First Embodiment

FIG. 1 is a block diagram showing the arrangement of a system according to the first embodiment of the present invention. As shown in FIG. 1, this system comprises a transmitting apparatus 1 and receiving apparatus 2. The transmitting apparatus 1 performs position indication and data transmission using a plurality of light-emitting element. The receiving apparatus 2 senses the light-emitting elements to detect the position of the transmitting apparatus 1 from the sensed image and also demodulate or decode transmitted data.

The transmitting apparatus 1 includes a position indicating section 11, data transmitting section 12, data processing unit 13, and power supply 14 for supplying power to the sections 11, 12, and 13. One or a plurality of sensors 3 (#1, #2, . . . ) (to be simply referred to as sensors 3 hereinafter) for acquiring data to be transmitted are connected to the transmitting apparatus 1.

Figure 2:
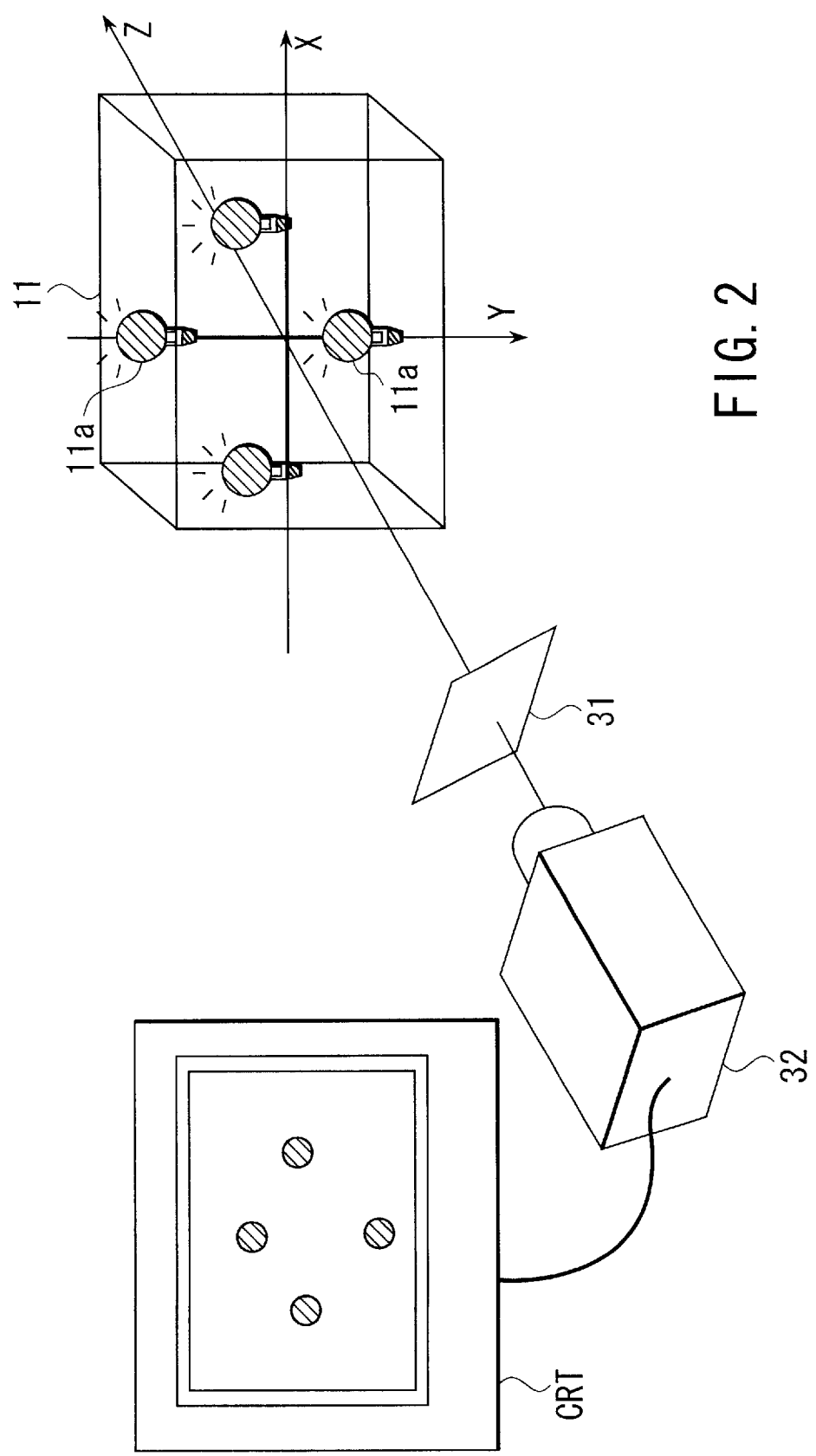
FIG. 2 is a view showing the principle of a position detection method according to the first embodiment.

The position indicating section 11 has four light-emitting elements 11a (FIG. 2). In this embodiment, infrared LEDs are used as these light-emitting elements. Three of the light-emitting elements 11a are laid out on the same plane, and the remaining one light-emitting element is laid out at a position slightly shifted from the plane. The four light-emitting elements 11a form an almost rhombic shape when viewed from the upper side of the plane. The light-emitting elements 11a are always ON during position detection.

FIG. 2 is a view showing the principle of a position detection method according to the first embodiment. As shown in FIG. 2, the four LEDs in the position indicating section 11 are sensed by an image sensing element 32 on the receiving apparatus side. On the basis of the coordinates of light points on the sensed image, the position or motion of an object is detected using triangulation.

Figure 3:
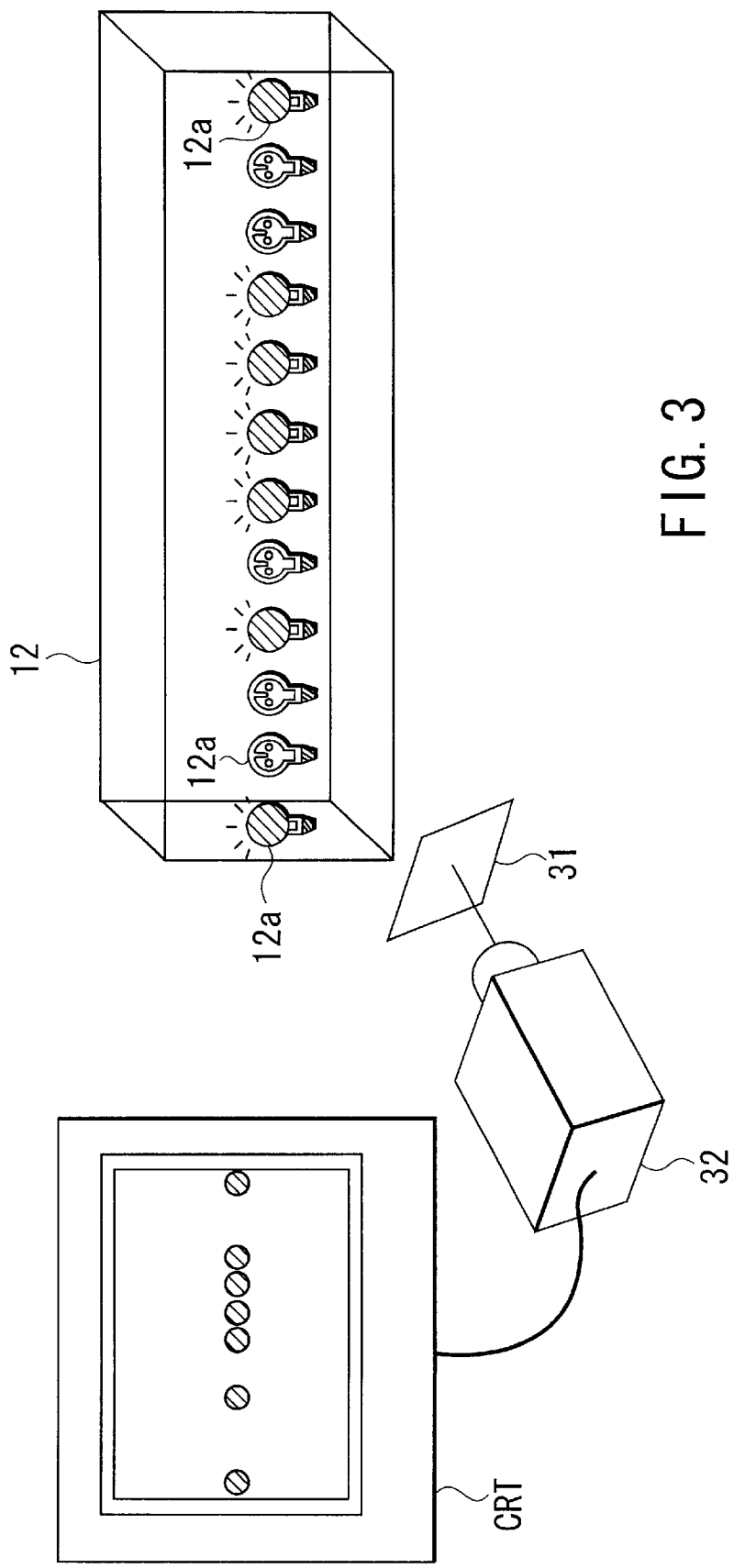
FIG. 3 is a view showing the principle of a data communicating method according to the first embodiment.

The data transmitting section 12 (FIG. 1) has 12 light-emitting elements 12a (FIG. 3). In this embodiment, infrared LEDs are used as these light-emitting elements. The 12 light-emitting elements 12a are arranged inside the four light-emitting elements 11a and, more specifically, between two apexes inside the rhombus formed by the light-emitting elements 11a. To transmit data, the light-emitting elements 12a blink and represent "1" in the ON state and "0" in the OFF state.

FIG. 3 is a view showing the principle of a data communicating method according to the first embodiment. As shown in FIG. 3, in data transmission, the 12 LEDs are simultaneously blinked to transmit 12-bit data. The data processing unit 13 is provided to realize this data transmission.

In the data processing unit 13 (FIG. 1), the sensor outputs from the sensors 3 are multiplexed by a multiplexer 21 and amplified by an amplifier 22. The amplifier output is converted into a pulse code sequence by a PCM (Pulse Code Modulation) unit 23 and input to the data transmitting section 12. The light-emitting elements 12a in the data transmitting section 12 blink in different manners in accordance with information, i.e., data supplied from the data processing unit 13. More specifically, a light-emitting element is turned on when the pulse code input from the data processing unit 13 is 1 (1.5V) and off when 0 (0V).

The multiplexer 21 multiplexes a plurality of data into one data. In this embodiment, the sensors 3 are connected to the multiplexer 21. The outputs from the sensors 3 are sequentially acquired at a predetermined period and multiplexed. In place of the sensors 3, data output units of another type may be connected to the multiplexer 21.

The PCM unit 23 performs pulse code modulation (or encoding process) for converting an analog information signal into a pulse code sequence. The PCM unit 23 comprises an A/D (analog/digital) converter 24, CPU 25 for data processing, and digital output section 26 for generating and outputting a pulse code sequence. The digital output section 26 has an S/P (serial/parallel) converting section 27. The S/P converting section 27 converts a serial pulse code sequence into a parallel signal such that the plurality of light-emitting elements 12a can display and output data of a plurality of bits (12 bits in this embodiment).

Various kinds of pulse modulation can be applied to the PCM unit 23, including pulse position modulation (PPM), pulse interval modulation (PSM and PIM), pulse time modulation (PTM), pulse frequency modulation (PFM), pulse amplitude modulation (PAM), pulse duration modulation (PDM), pulse duration modulation frequency modulation (PDMFM), and pulse number modulation (PNM). Even when digital data is input, a pulse code sequence can be generated. In this case, the A/D converter 24 can be omitted.

The arrangement of the receiving apparatus 2 shown in FIG. 1 will be described next. The receiving apparatus 2 includes the image sensing element 32 such as a CCD camera with an infrared filter 31 for passing only infrared light from the infrared LEDs, a receiving apparatus main body 33, and a display unit 34.

The receiving apparatus main body 33 has, in a computer such as a workstation or personal computer, an expansion board including an A/D converter 41 and an expansion board for processing an image signal, and implements necessary function means by the hardware and software. For the purpose of size reduction and power saving, the receiving apparatus main body 33 may have a one-board or one-chip structure.

In the receiving apparatus main body 33, the image sensing element output is A/D-converted by the A/D converter 41. The A/D output is processed by an image processing section 42 to detect the coordinates of the light-emitting elements 11a and 12a. On the basis of the detected light-emittinglelement coordinates, a position detecting section 43 and data analyzing section 44 detect the position of the transmitting apparatus 1 and demodulate or decode data from the apparatus 1. The detected position information and received data are stored in a data storage section 45 and processed for display by a display information processing section 46.

Figure 4:
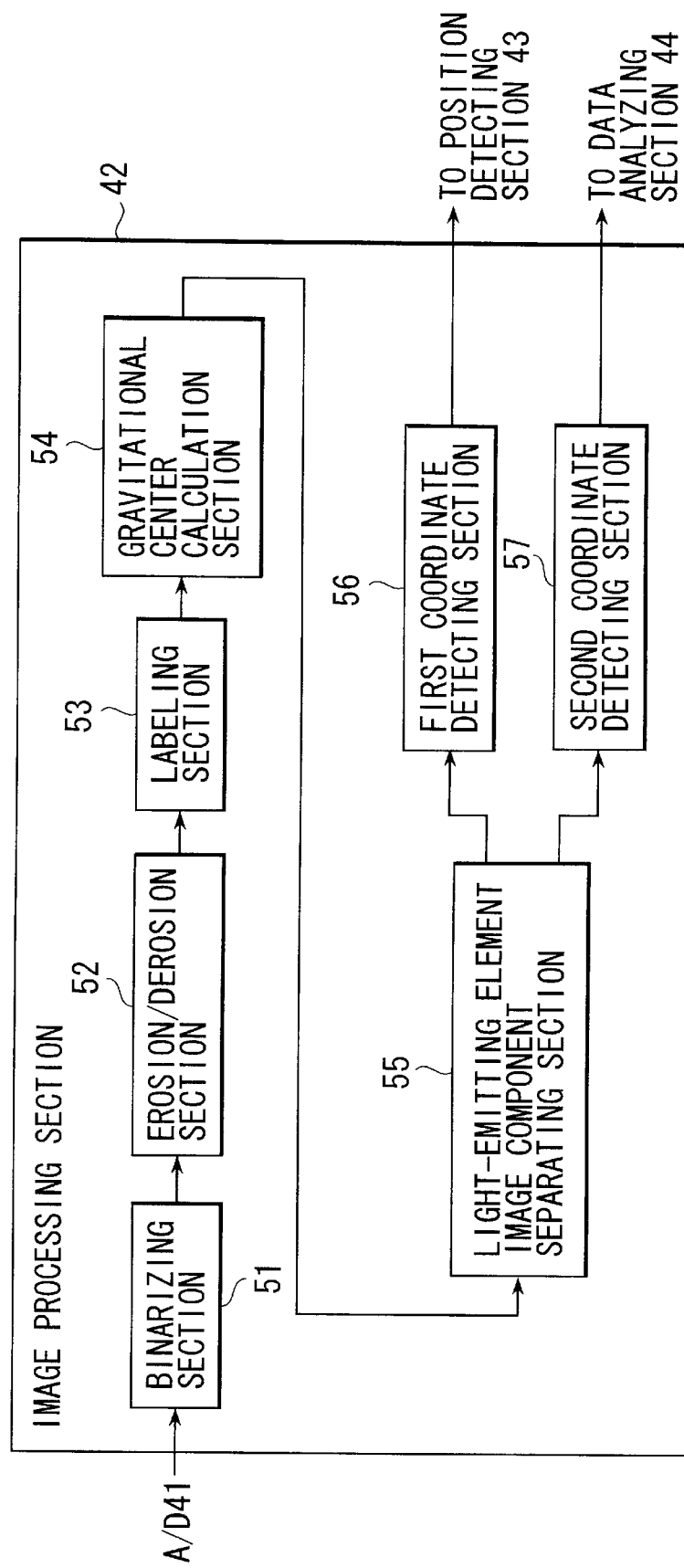
FIG. 4 is a block diagram showing the arrangement of an image processing section in a receiving apparatus of the first embodiment.

FIG. 4 is a block diagram showing the arrangement of the image processing section in the receiving apparatus of the first embodiment. The image processing section 42 is constituted by an image processing board and software dedicated to it and has functions shown in FIG. 4.

As shown in FIG. 4, the image processing section 42 sequentially processes the A/D conversion output from the image sensing element 32 through a binarizing section 51, erosion/derosion section 52, labeling section 53, and gravitational center calculation section 54. The processing result is separated into a position detection image component and data communication image component by a light-emitting element image component separating section 55. A first coordinate detecting section 56 and second coordinate detecting section 57 execute coordinate detection processing on the position detection image component and data communication image component, respectively. The coordinate values of the position indicating light-emitting elements 11a and those of the data transmission light-emitting elements 12a are output to the position detecting section 43 and data analyzing section 44, respectively.

The binarizing section 51 converts grayscale data of each pixel of the CCD output into binary data using a threshold value as a reference. With this processing, the grayscale image is converted into a monochrome image in which light-emitting element ON portions correspond to white portions, and the remaining portions correspond to black portions. The erosion/derosion section 52 temporarily erodes and derodes the binarized monochrome image, thereby removing noise. The labeling section 53 scans the binary image and sequentially labels white pixel groups corresponding to light-emitting element images so that the light-emitting elements 11a and 12a are discriminated from each other. The gravitational center calculation section 54 obtains the gravitational center of each labeled white pixel group, thereby calculating the coordinates of the light-emitting elements 11a and 12a on the image.

The image component separating section 55 separates the image component of the light-emitting elements 11a and that of the light-emitting elements 12a. Since the light-emitting elements 11a are located outside the light-emitting elements 12a, light-emitting element images at the outermost positions in the vertical and horizontal directions of the sensed image correspond to the light-emitting elements 11a. The remaining light-emitting element images correspond to the light-emitting elements 12a. This separation is easy because the light-emitting elements 11a are always ON and are always located outside the light-emitting elements 12a.

The first coordinate detecting section 56 detects the coordinates, on the image, of the position indicating light-emitting elements 11a discriminated by the image component separating section 55. The second coordinate detecting section 57 detects the coordinates, on the image, of the data transmission light-emitting elements 12a discriminated by the image component separating section 55. The pieces of detected coordinate information of the light-emitting elements 11a and 12a are input to the position detecting section 43 and data analyzing section 44 (FIG. 1) and further subjected to processing.

The position detecting section 43 determines that the coordinates of the light-emitting element images input from the image processing section 42 indicate the light-emitting elements 11a in the vertical and horizontal directions. The coordinates of the transmitting apparatus in the real space are calculated using triangulation and Newton's method of numerical analysis on the basis of the light-emitting element coordinates. The calculation result is input to the display information processing section 46 and simultaneously stored in the data storage section 45.

Position detection processing by the position detecting section 43 will be described below in more detail. Let point sets P1, P2, P3, ..., Pn be the coordinate points of the light-emitting elements 11a. Then, a distance dij between the points is given by $$dij=|Pi-Pj| \quad (1)$$

for $1 \leq i$ and $j \leq n$

Let u1, ..., un (for $|ui|=1$ ($1 \leq i \leq n$) be the line-of-site vectors from an observation point (a position where the image sensing element is located). Then, a distance αi between the observation point and each light-emitting element 11a is given by $$\alpha i=|pi| \quad (2)$$

for Pi=αiui
Thus, we have:

$$|\alpha i ui - \alpha j uj|=|Pi-Pj|=dij \quad (3)$$

for $1 \leq i$ and $j \leq n$

Hence, αi that satisfies equation (3) is obtained. The distance αi can be obtained by various methods. In this embodiment, given a residual tij defined by $$tij=(\alpha i^2 - 2Cij\alpha i \alpha j + \alpha j^2 - dij^2)/2 \quad (4)$$

for tij=tji
αi when this residual tij is minimized is obtained using the least square method.

A minimizing functional F is given by $$F(\alpha 1, \ldots \alpha n) = \frac{1}{2}\sum_{i=1}^{n-1}\sum_{j=i+1}^{n} tij^2 \quad (5)$$

To solve this minimizing functional, a condition under which the gradient of this functional F becomes zero is used. That is, $$\nabla F = \left(\frac{\partial F}{\partial \alpha i}\right)_{i=1}^{n} = 0 \quad (6)$$

A numerical value analysis method called Newton's method is used, as described above, to calculate this nonlinear equation using a computer.

In this embodiment, since one of the four light-emitting elements 11a is not located on the same plane as that of the remaining elements, the coordinates can be accurately calculated. Assume that four position indicating light-emitting elements are laid out on the same plane, and an axis is defined through the left and right diagonal points of the rhombic shape. Consider two positions rotated about the axis by the same angle in the back-and-forth direction with respect to the CCD image sensing surface. The two positions cannot be discriminated on the sensed image. This is because the points rotated in the back-and-forth direction have the same projection result on the image sensing surface. Points rotated about an axis defined through the upper and lower light-emitting elements by the same angle in the right and left directions cannot be discriminated, either. In this embodiment, the above disadvantage can be avoided because the lower light-emitting element 11a is located on a plane different from that of the three remaining points (the three points are located on the same plane).

The data analyzing section 44 calculates, of the 12 light-emitting elements 12a, which element is ON and which element is OFF, on the basis of the coordinates of the light-emitting elements 12a, that are input from the image processing section 42. The transmitted data is reconstructed in accordance with the calculation result. Correspondences between the light-emitting element images and the light-emitting elements 12a are determined on the basis of the positional relationship with respect to the light-emitting elements 11a.

The data analyzing section 44 has a P/S (parallel/serial) converting section 47 and demultiplexer 48. To demodulate or decode the transmitted data, the transmitted data as parallel data is converted into serial data by the P/S converting section 47. The converted serial data is demultiplexed into data in units of a sensor 3 by the demultiplexer 48, input to the display information processing section 46, and stored in the data storage section 45.

The display information processing section 46 generates a window indicating the position of the transmitting apparatus 1 on the basis of the position information and reception data received from the position detecting section 43 and data analyzing section 44, and outputs the window with the reception data displayed therein to the display unit 34.

The operation of the system according to this embodiment having the above arrangement will be described next.

In this system, first, transfer data from the sensors 3 is digitized by the data processing unit 13 in the transmitting apparatus 1 attached to the object. The light-emitting elements 12a blink toward the image sensing element 32 of the receiving apparatus 2 in accordance with a pulse waveform sequence from the data processing unit 13. More specifically, the light-emitting elements 12a in the data transmitting section 12 blink in different manners in accordance with information, i.e., data supplied from the data processing unit 13. On the other hand, the light-emitting elements 11a are always ON.

This embodiment assumes use of infrared LEDs as the light-emitting elements 11a and 12a. To remove the influence of undesired light-emitting bodies, an image is sensed by the image sensing element 32 of the receiving apparatus 2 through the infrared filter 31. The image sensing result is A/D-converted, and the light-emitting element coordinates are detected by the image processing section 42 using an image processing algorithm (binarization, erosion/derosion, and labeling).

The light-emitting element coordinate values detected by the image processing section 42 and separated for position detection and data reception are input to the position detecting section 43 and data analyzing section 44, which execute position detection and data reconstruction, respectively. Thus, the position of the object to which the transmitting apparatus 1 is attached and the transmitted data from the object are acquired.

The acquired position information and reception data are stored in the data storage section 45 and extracted for use as needed. These data are displayed on the display unit 34 for use by the system user.

Characteristic features of the data transmission/reception will be described below.

In this embodiment, data is transmitted by blinking the light-emitting bodies (light-emitting elements 12a). A data transfer rate H per unit time is given by $$H=n\omega p \quad (7)$$

where n is the number of light-emitting bodies (12 in this embodiment), and ωp is the blinking frequency The blinking frequency of each light-emitting body must be equal to or smaller than a sampling frequency ωi at which the image sensing element acquires one frame image on the basis of sampling theorem. Hence, the data transfer rate can also be given by $$H < n\omega i/2 \qquad (8)$$

A solid-state image sensing device, e.g., CCD (Charge Coupled Device) is a typical image sensor, though it has a limited sampling frequency because of its principle. For this reason, to increase the data transfer rate H using a CCD image sensor as the image sensing element 32, the number n of data transmission light-emitting elements 11a must be increased. If the data transfer rate does not matter, the number n may be 1. In this case, serial/parallel conversion and parallel/serial conversion before and after data transmission/reception are unnecessary.

When an image sensor such as a CMOS image sensing element or photodiode is used as the image sensing element 32 in place of the CCD, the sampling frequency can be made higher, and high-speed data transmission/reception is enabled. However, since the number of pixels of such an image sensor is smaller than that of the CCD, a high-resolution image can hardly be obtained, and the number of light-emitting elements 12a used for data transmission cannot be increased. Hence, the number of light-emitting bodies and the type of image sensing element 32 are appropriately determined in accordance with the data transfer rate.

When a TV camera is used as the image sensing element 32, the data transfer rate is limited to the video rate or 30 Hz. However, when n light-emitting elements 12a are used, the data transfer rate per unit time can be 30×N (bits) in accordance with equation (7). For a CCD sensor as well, a sampling frequency equal to or more than the video rate can be ensured.

The type of light-emitting elements 11a and 12a will be described next.

Although infrared LEDs are used as the light-emitting elements 11a and 12a in this embodiment, the type of light-emitting elements is selected in accordance with the purpose or use situation. Basically, the light-emitting elements 11a and 12a preferably have high luminance and directivity. In addition, the light-emitting elements 12a preferably have high luminance rising/falling speed.

In practice, the light-emitting elements are appropriately selected in accordance with the distance between the transmitting apparatus 1 and the receiving apparatus 2, considering the use environment and cost of the system. When the distance is several meters, inexpensive and low-power "infrared LEDs" with small light-emitting intensity are used. For a larger distance, high-luminance laser diodes are preferably used. Instead of laser diodes, lasers of another type, such as gas lasers, may be used.

Laying out the light-emitting elements 11a and 12a at an extremely small interval results in position detection and data transmission/reception errors. The light-emitting element layout interval is appropriately determined in accordance with the system use environment, the lens attached to the image sensing element, and the degree of directivity of light-emitting elements.

As described above, in the system according to the first embodiment of the present invention, the transmitting apparatus 1 attached to the object has the position indicating section 11 and data transmitting section 12. Object position detection and data transmission/reception are performed using light. Hence, position detection and data communication can be simultaneously realized independently of radio wave conditions. More specifically this system can be used even in a hospital where the use of radio waves is restricted or outerspace where the system is exposed to strong electromagnetic waves.

In the receiving apparatus 2 of this embodiment, the light-emitting element image can be analyzed only by relatively simple image processing. For this reason, position detection and data reception can be realized by real-time processing.

In the transmitting apparatus 1 of this embodiment, instead of laying out all the position indicating light-emitting elements 11a on only one plane, at least one light-emitting element 11a is laid out on a plane different from that of the plurality of remaining light-emitting elements 11a. For this reason, the position of the object can be reliably and accurately detected even when the object is rotating and simultaneously translating. Hence, a system comprising a position indicating unit or transmitting apparatus having such characteristic features can accurately detect the position of an object independently of the moving state of the object.

Figure 18:
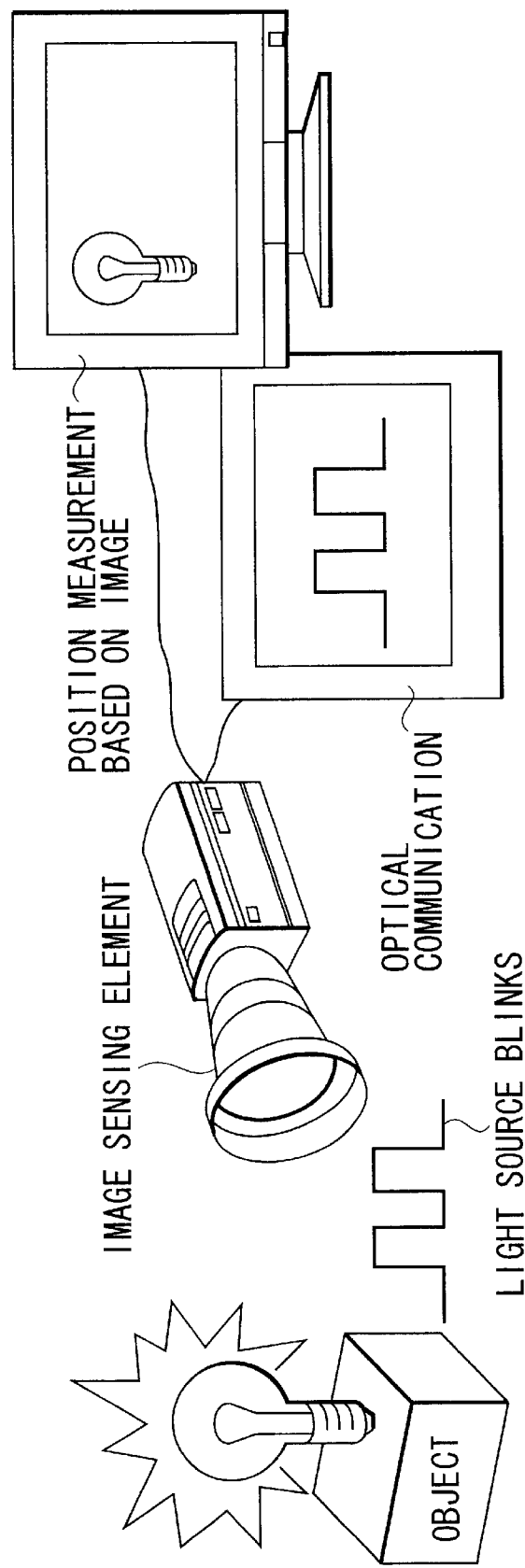
FIG. 18 is a view showing the principle of a technique of simultaneously performing position detection and data communication using light.

In this embodiment, the position indicating light-emitting elements 11a are arranged independently of the data transmission light-emitting elements 12a, such that the elements 11a are exclusively used for position indication while the elements 12a are exclusively used for data transmission. However, as described with reference to FIG. 18, the same one set of light-emitting elements may be used for both the position indication and data transmission. In other words, the light-emitting elements 11a and 12a may be used for both the position indication and data transmission.

Since infrared LEDs are used as the light-emitting elements 11a and 12a in this embodiment, the infrared filter 31 is used on the receiving apparatus side. However, the present invention is not limited to this. If no other light source is present, the filter itself can be omitted. If the light-emitting elements 11a and 12a have another light emission wavelength, a filter for passing only light in that wavelength range is used.

In this embodiment, data transmitted by the transmitting apparatus 1 is information from the sensors 3. However, communication data in the present invention is not limited to such sensor information and can be data of any other types. In this embodiment, since analog data is transmitted from the sensors 3, the data processing unit requires the A/D converter 24. However, the original data to be transmitted may be digital data. In this case, the amplifier 22 and A/D converter 24 can be omitted, and the digital data is processed by the CPU 25 for pulse code modulation. In this embodiment, since pieces of sensor information are transmitted/received, the multiplexer 21 and demultiplexer 48 are used on the transmitting and receiving sides. However, the multiplexer 21 and demultiplexer 48 can be omitted depending on the type of transmission/reception data.

FIG. 1 shows one transmitting apparatus 1 and one receiving apparatus 2. However, the system can be constructed using one or a plurality of transmission/receiving apparatuses.

In this embodiment, the light-emitting elements are monochrome (infrared), and a monochrome image is processed by image processing. However, the present invention can also be implemented even for a color image. A modification using a color image will be described below. This modification can also be applied to the second and subsequent embodiments on the basis of the same idea.

Figure 5:
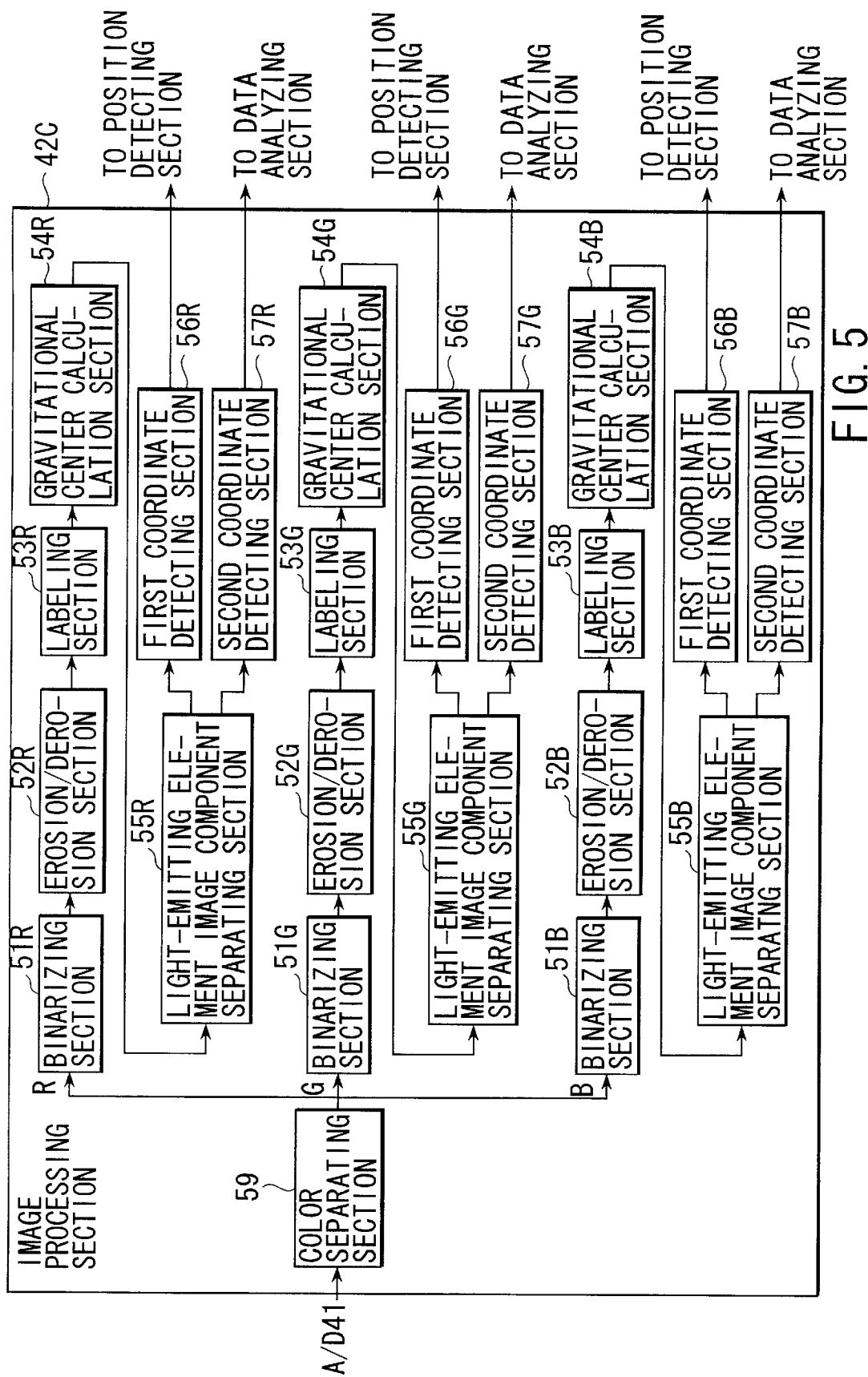
FIG. 5 is a block diagram showing the arrangement of the image processing section in the receiving apparatus in processing a color image as a modification to the first embodiment.

FIG. 5 is a block diagram showing the arrangement of the image processing section in the receiving apparatus in processing a color image as a modification to the first embodiment.

As shown in FIG. 5, for a color image, an image processing section 42c has a color separating section 59. Separated R, G, and B data are input to corresponding binarizing sections 51R, 51G, and 51B, respectively. Processing sections 51R to 57R, 51G to 57G, and 51B to 57B corresponding to the R, G, and B color components, respectively, execute the same processing as in corresponding portions shown in FIG. 4, thereby realizing color image processing. Instead of the color separating section 59, color filters may be inserted between the A/D converter 41 and image processing section 42c.

In this case, when light-emitting elements of different colors are used as the position indicating light-emitting elements 11a and data transmission light-emitting elements 12a and sensed by a color image sensing element, processing considering the color difference between the light-emitting elements can be performed. Hence, the image components of the light-emitting elements 11a and 12a can be more easily separated, and the processing speed can be increased.

If position indicating light-emitting elements of two types are used for short and long distances, the position detection accuracy can be improved. In this case, when different colors are used for short and long ranges, the image components of the light-emitting elements can be easily separated. As for grouping, not only the long- and short-range groups but also an intermediate-range group may be defined. Alternatively, another group may be defined in accordance with another range.

Since the RGB processing system shown in FIG. 5 executes parallel processing, a computer having a plurality of CPUs can realize efficient and high-speed processing.

Second Embodiment

Figure 6:
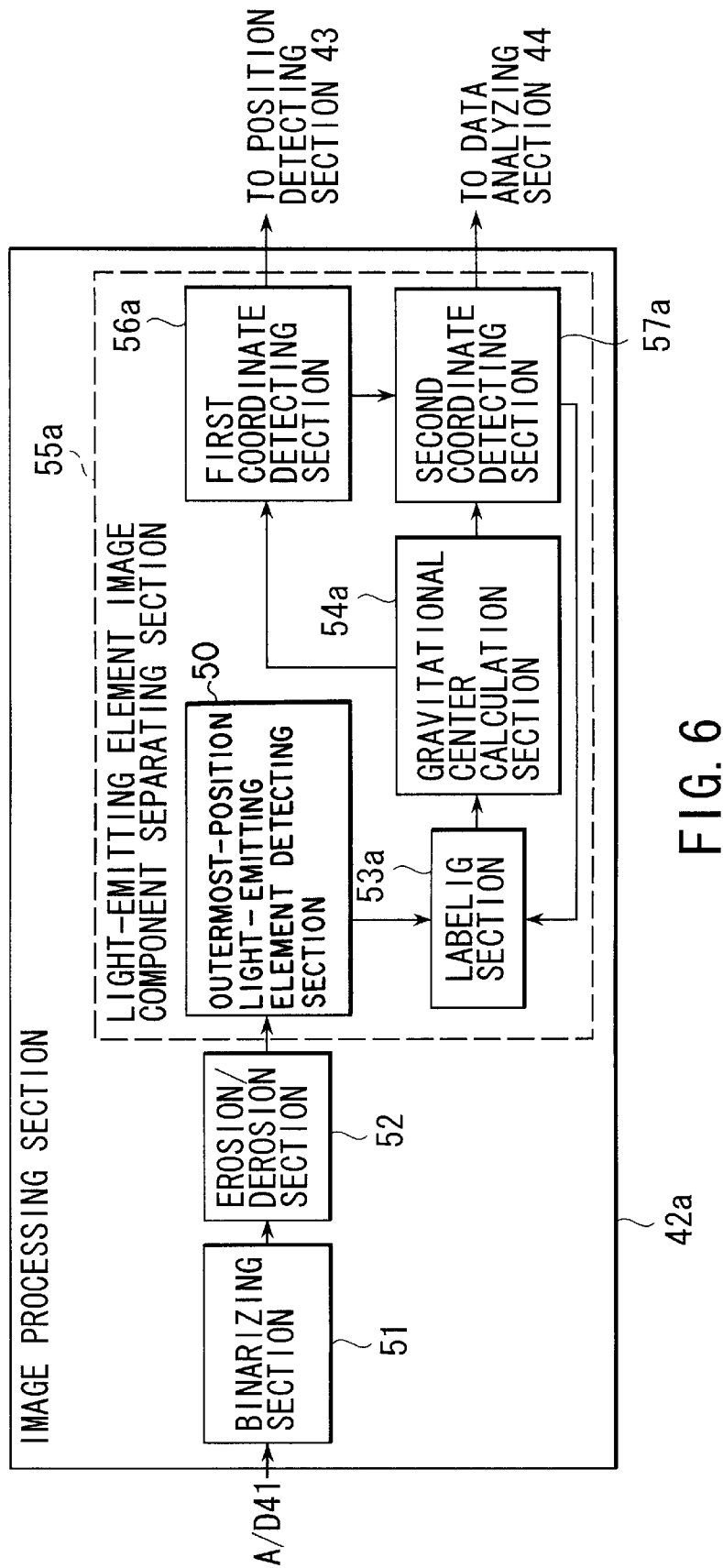
FIG. 6 is a block diagram showing the arrangement of an image processing section in a receiving apparatus according to the second embodiment of the present invention.

FIG. 6 is a block diagram showing the arrangement of an image processing section in a receiving apparatus according to the second embodiment of the present invention. In this embodiment, the arrangement of the image processing section 42 in the first embodiment is improved to enable higher-speed coordinate detection by light-emitting elements 11a and 12a. The system of the second embodiment has the same arrangement as in the first embodiment except that the function of an image processing section 42a is modified as shown in FIG. 6.

The image processing section 42a receives a sensed image from an A/D converter 41, detects the coordinates of the light-emitting elements 11a and those of the light-emitting elements 12a from the image, and outputs the coordinates to a position detecting section 43 and data analyzing section 44. For this purpose, the image processing section 42a has a binarizing section 51, erosion/derosion section 52, and light-emitting element image component separating section 55a. The binarizing section 51 and erosion/derosion section 52 have the same arrangements as in the first embodiment.

The light-emitting element image component separating section 55a extracts and separates the image components of the light-emitting elements 11a and 12a from the binary image free from noise and outputs the coordinates of the image components. For this purpose, the image component separating section 55a comprises an outermost-position light-emitting element detecting section 50, labeling section 53a, gravitational center calculation section 54a, first coordinate detecting section 56a for position, and second coordinate detecting section 57a for data.

The outermost-position light-emitting element detecting section 50 sequentially scans the binary image free from noise from the upper and lower, and left and right outermost positions, thereby detecting white pixel groups. Instead of executing this processing across the image region, minimum scanning for detecting four groups at the upper and lower, and left and right outermost positions is performed: for example, when a group is detected by scanning from the upper outermost position, scanning processing from the lower outermost position is started immediately. The detecting section 50 inputs the four white pixel groups to the labeling section 53a as position indicating light-emitting element images.

Upon receiving the four position indicating light-emitting element images from the detecting section 50, the labeling section 53a labels the groups to identify the position indicating light-emitting element images, and outputs the images to the gravitational center calculation section 54a. When coordinates (estimated coordinates) at which data transmission light-emitting elements are estimated to be present are received from the second coordinate detecting section 57a, the labeling section 53a scans a region with an appropriate size near the coordinates on the binary image, thereby detecting white pixel groups. When white pixel groups are detected, the labeling section 53a labels these groups to identify the data transmission light-emitting element images and outputs the images to the gravitational center calculation section 54a.

The gravitational center calculation section 54a can perform the same processing as in the first embodiment. In addition, when a certain white pixel group is a position indicating light-emitting element image, the gravitational center calculation section 54a outputs the result to the first coordinate detecting section 56a, and for a data transmission light-emitting element image, outputs the result to the second coordinate detecting section 57a.

The first coordinate detecting section 56a detects the coordinates of the light-emitting elements 11a on the image on the basis of the gravitational center calculation result and outputs the coordinates to the position detecting section 43 and second coordinate detecting section 57a. The second coordinate detecting section 57a detects the coordinates of the light-emitting elements 12a on the image on the basis of the gravitational center calculation result and outputs the coordinates to the data analyzing section 44. When the coordinates of the light-emitting elements 11a on the image are received from the coordinate detecting section 56a, the coordinate detecting section 57a calculates the estimated coordinates of the light-emitting elements 12a and inputs them to the labeling section 53a.

The estimated coordinates,are calculated on the basis of the fact that the relative positional relationship between the light-emitting elements 11a and the light-emitting elements 12a are known. In the second embodiment (this also applied to the first embodiment), the light-emitting elements 11a are located outside the light-emitting elements 12a, and the four light-emitting elements 11a form a rectangle rotated by 45° with respect to the rectangular image sensing region, as shown in FIG. 7.

Figure 7:
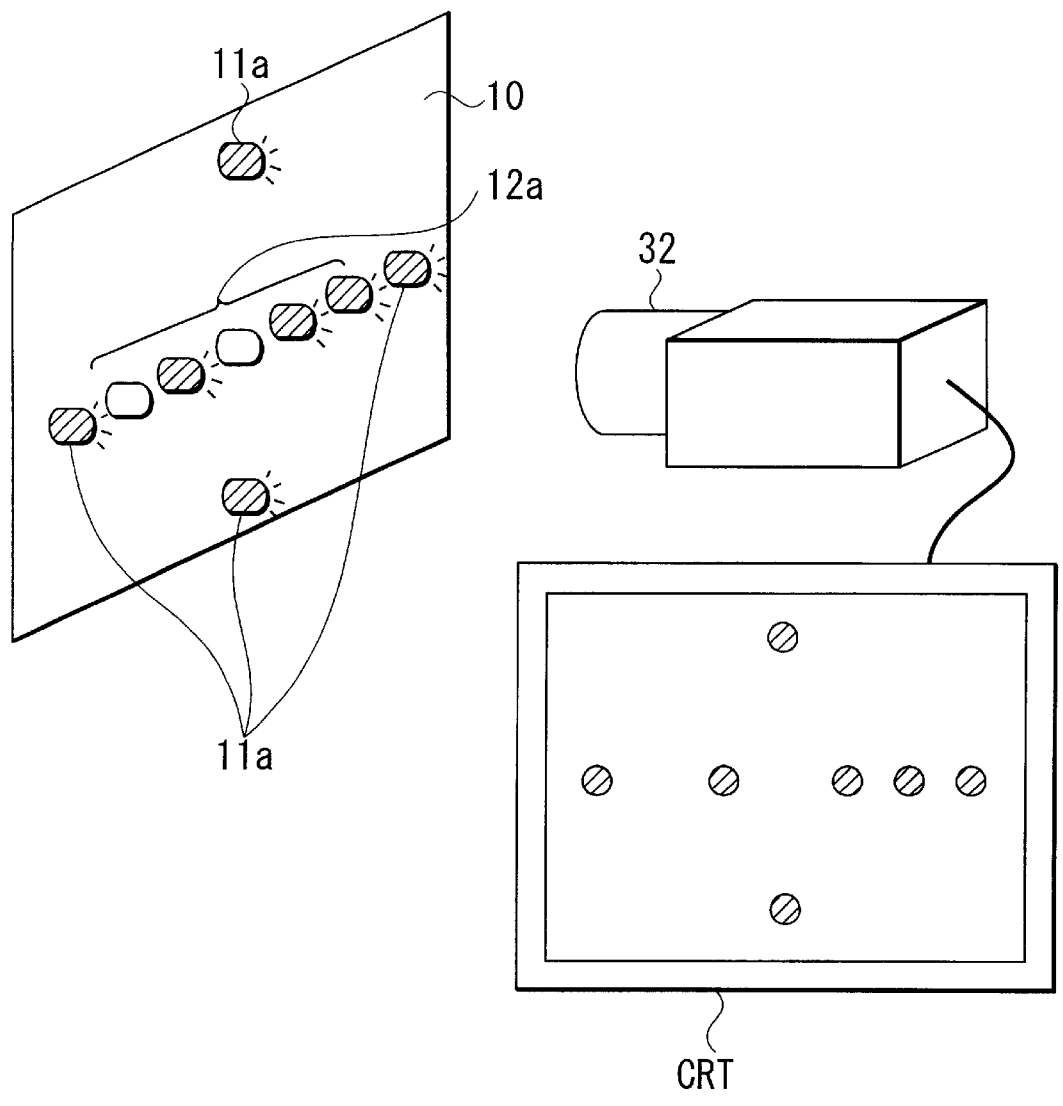
FIG. 7 is a view for explaining the positional relationship between position indicating light-emitting elements and data transmission light-emitting elements.

FIG. 7 is a view for explaining the positional relationship between the position indicating light-emitting elements 11a and the data transmission light-emitting elements 12a. On a support panel 10, the light-emitting elements 12a are laid out on a straight line between two light-emitting elements 11a at diagonal points. The light-emitting elements 12a can be laid out in either the vertical or horizontal direction. In this embodiment, the light-emitting elements 12a are laid out between the two light-emitting elements 11a at the left and right outermost positions, as shown in FIG. 7. The light-emitting elements 12a can take various layouts relative to the position indicating light-emitting elements 11a.

In this embodiment, since the light-emitting elements 12a are laid out on a straight line between the two light-emitting elements 11a at the left and right points, as shown in FIG. 7, the coordinates at which the light-emitting elements 12a must be present can easily be estimated by detecting the coordinates of the light-emitting elements 11a on the binary image. The second coordinate detecting section 57a executes this estimation processing. The labeling section 53a scans only a predetermined region on the basis of the estimated coordinates. As a result, the entire binary image need not be scanned, and high-speed image processing is realized.

Figure 8:
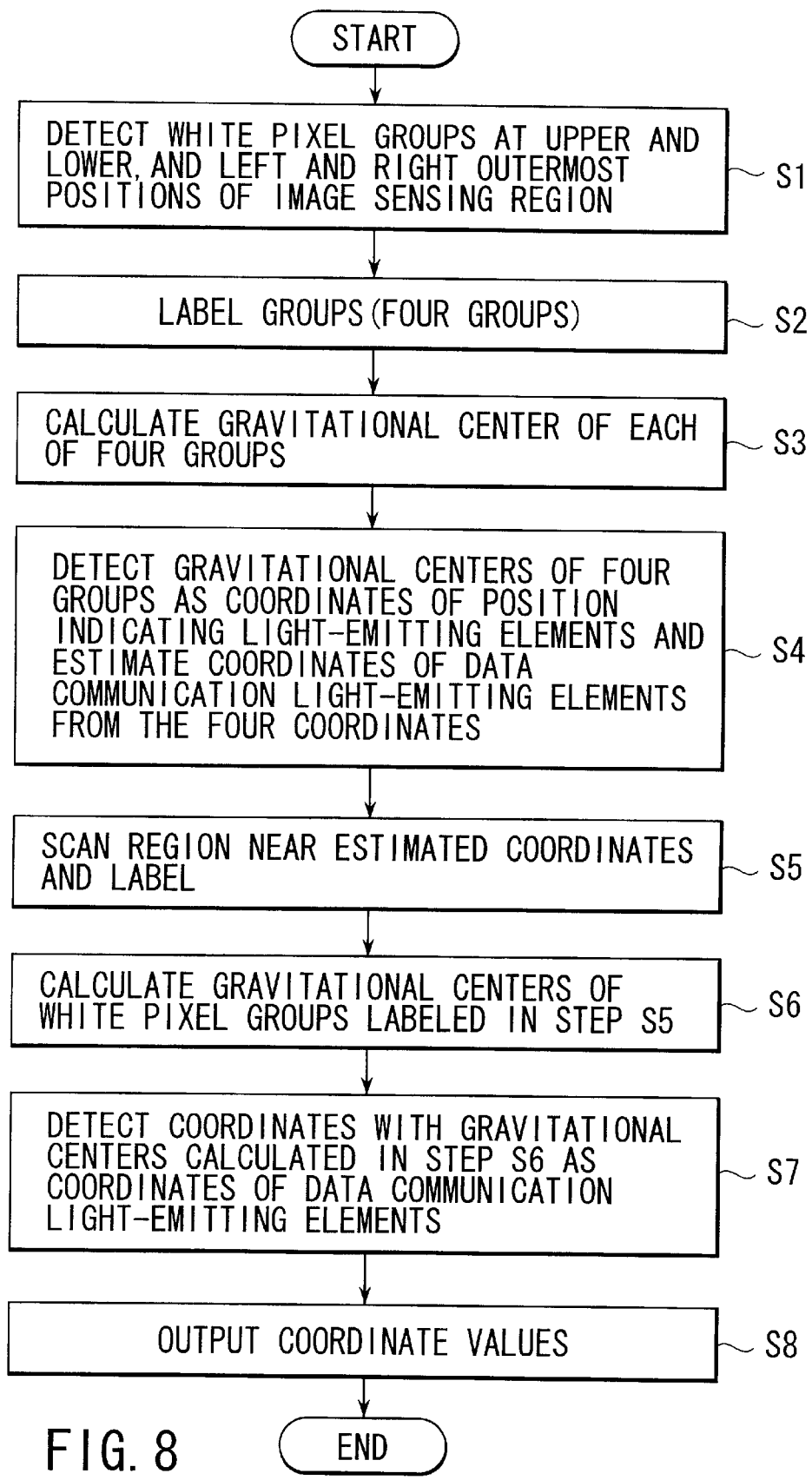
FIG. 8 is a flow chart showing processing by a light-emitting element image component separating section.

The processing flow of coordinate detection by the light-emitting element image component separating section 55a in this embodiment will be described next with reference to FIG. 8. FIG. 8 is a flow chart showing processing by the light-emitting element image component separating section.

First, the binary image whose noise is removed by the erosion/derosion section 52 is input to the light-emitting element image component separating section 55a. The outermost-position light-emitting element detecting section 50 detects white pixel groups at the upper and lower, and left and right outermost positions (S1). The labeling section 53a labels the detection result (S2), and the: gravitational center calculation section 54a calculates the gravitational centers (S3).

On the basis of the gravitational center calculation result, the first coordinate detecting section 56a detects the coordinates of the position indicating light-emitting elements. In addition, on the basis of the detected coordinates of the position indicating light-emitting elements, the second coordinate detecting section 57a estimates the coordinates of the data transmission light-emitting elements and inputs them to the labeling section 53a (S4).

The labeling section 53a scans only a region near the estimated coordinates and labels detected white pixel groups (S5). The gravitational centers are also calculated (S6). The gravitational center calculation result obtained in step S6 is.input to the second coordinate detecting section 57a, and the coordinates of the data transmission light-emitting elements are acquired (S7). The coordinate values are output from the first coordinate detecting section 56a and second coordinate detecting section 57a to the position detecting section 43 and data analyzing section 44, respectively (S8).

As described above, the receiving apparatus according to the second embodiment of the present invention has the same arrangement as that of the first embodiment and can detect coordinates using the positional relationship between the position indicating light-emitting elements and the data transmission light-emitting elements without scanning the entire region of the binary image. For this reason, image processing can be executed at a high speed, and a system with high response speed can be implemented. Since the image processing speed is high, the number of data transmission light-emitting elements can be increased to ensure the same response speed, and the data transfer speed can be made high.

Third Embodiment

Figure 9:
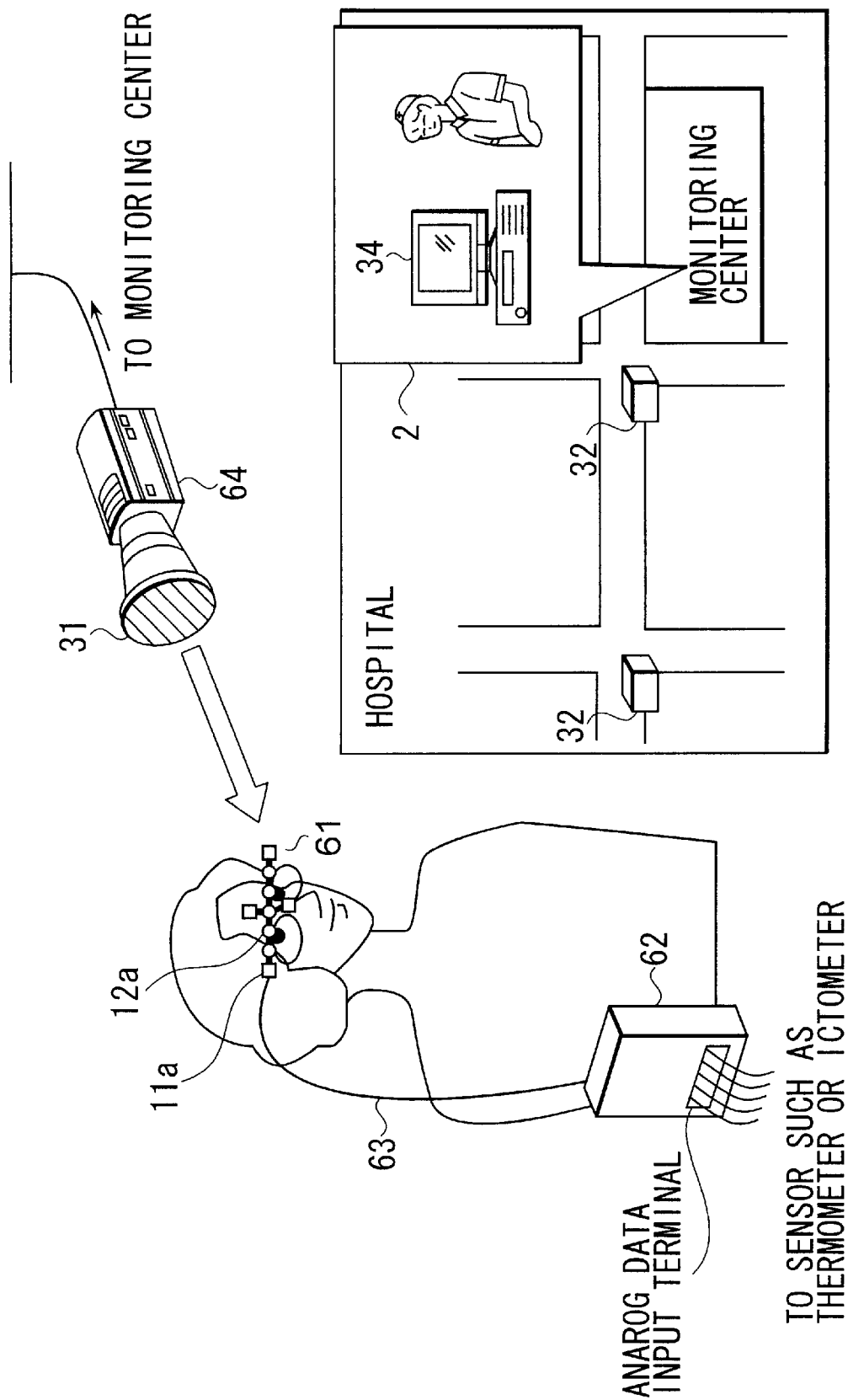
FIGS. 9A and 9B are views showing the arrangement of a hospital monitoring system according to the third embodiment of the present invention.

FIGS. 9A and 9B are views showing the arrangement of a hospital monitoring system according to the third embodiment of the present invention. In this embodiment, the system of the first or second embodiment is applied to a hospital monitoring system. This hospital monitoring system has the same arrangement as that of the first or second embodiment except that a number of image sensing cameras 64 serving as image sensing elements 32 are arranged in a hospital, and a number of transmitting apparatuses 1 are provided in correspondence with patients.

Referring to FIG. 9A, an eyeglasses frame 61 having LEDs, processing circuit & battery pack 62, and data transmission & power supply cable 63 construct the transmitting apparatus 1 shown in FIG. 1. This apparatus is attached to a patient to be detected. A thermometer and ictometer (not shown) are also attached to the patient as sensors 3 shown in FIG. 1. Although not illustrated, the transmitting apparatus 1 transmits not only sensor information from the thermometer and ictometer but also identification information of the patient together with the sensor information.

On the other hand, a receiving apparatus main body 33 (FIG. 1) and display unit (CRT) 34 are arranged in the monitoring center in the hospital, as shown in FIGS. 9A and 9B. A plurality of image sensing cameras 64 are provided as the image sensing elements 32. These units constitute a receiving apparatus 2. If the processing capability is insufficient for the plurality of image sensing cameras 64, a plurality of receiving apparatus main bodies 33 are provided in correspondence with, e.g., the image sensing cameras 64. When a plurality of receiving apparatus main bodies 33 are used, the receiving apparatus main bodies 33 are connected to a network, and pieces of information are arranged in units of patients on the basis of patient ID information and displayed on the display unit 34.

The hospital monitoring system having this arrangement monitors patients in a hospital. More specifically, the transmitting apparatus 1 and sensors 3 are attached to a patient who moves in the hospital. The monitoring center (e.g., nurse station) checks the heartbeat rate and bodily temperature of the patient while monitoring the current position of the patient. If any abnormality is observed in the patient, nurses rush to the scene.

As described above, since the hospital monitoring system according to the third embodiment of the present invention has the transmitting apparatus 1 and receiving apparatus 2, the position and state of a patient can be monitored even in the hospital which restricts radio wave use.

Fourth Embodiment

Figure 10:
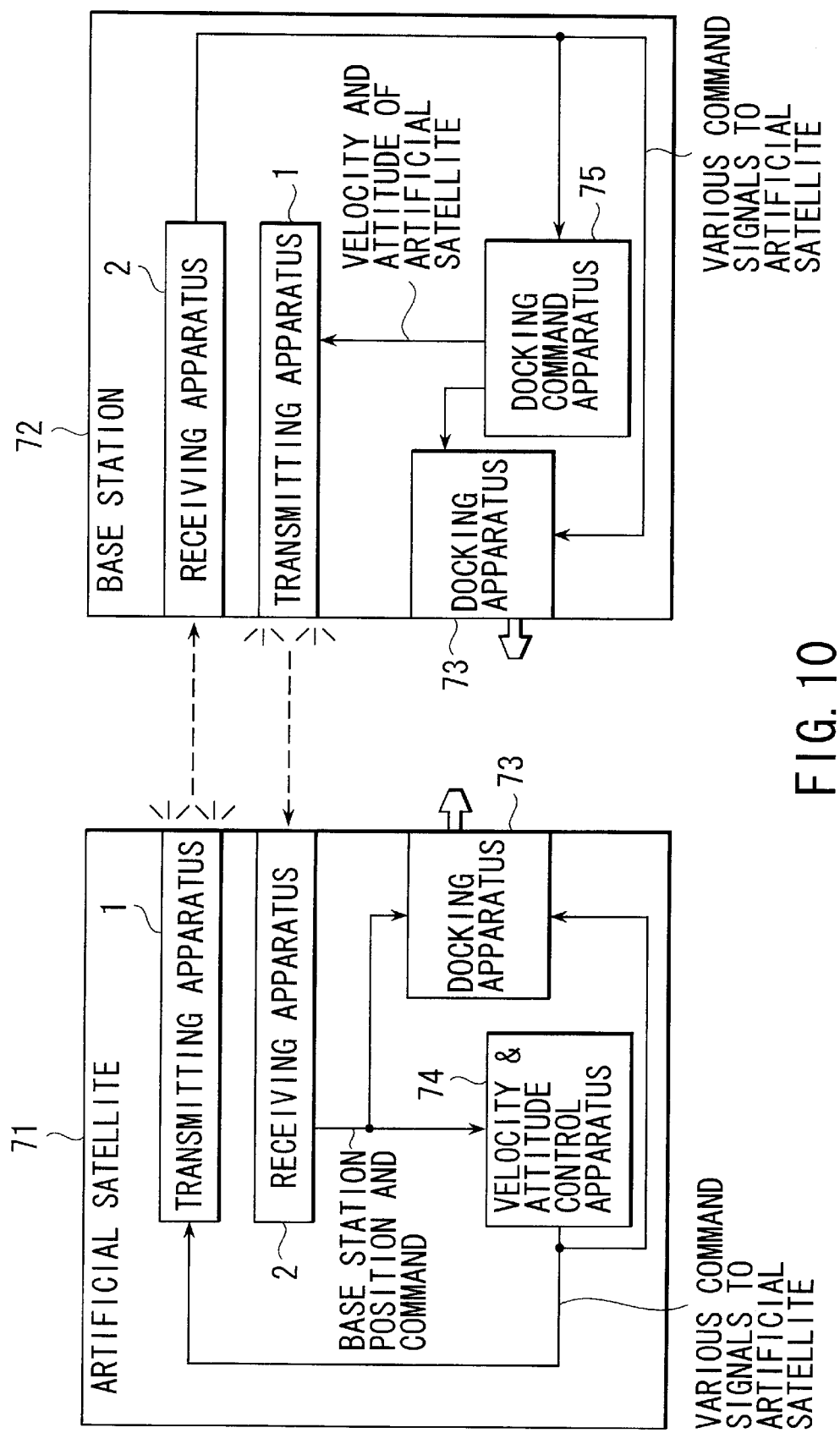
FIG. 10 is a block diagram showing the arrangement of a moving body docking assist system according to the fourth embodiment of the present invention.

FIG. 10 is a block diagram showing the arrangement of a moving body docking assist system according to the fourth embodiment of the present invention. In this embodiment, the system of the first or second embodiment is used for an artificial satellite docking assist system. In this embodiment, an artificial satellite docking assist system for docking an artificial satellite and base station will be described.

This moving body docking assist system is constructed as an artificial satellite docking assist system and incorporated in an artificial satellite 71 and base station 72. The artificial satellite 71 includes a transmitting apparatus 1, receiving apparatus 2, docking apparatus 73, and velocity & attitude control apparatus 74. The base station 72 includes the transmitting apparatus 1, receiving apparatus 2, docking apparatus 73, and docking command apparatus 75. The transmitting apparatus 1 and receiving apparatus 2 included in each of the artificial satellite 71 and base station 72 have the same arrangements as in the first embodiment except that laser diodes are used as light-emitting elements 11a and 12a, and a infrared filter 31 is omitted.

To give various commands for docking to the artificial satellite 71, the docking command apparatus 75 supplies the command signals to the transmitting apparatus 1 and causes it to transmit them to the artificial satellite 71. The docking apparatuses 73 in the artificial satellite 71 and base station 72 realize docking on the basis of artificial satellite velocity and attitude information acquired from the receiving apparatus 2 or velocity & attitude control apparatus 74 and various commands received from the docking command apparatus 75. The velocity & attitude control section 74 acquires base station position information and command signals from the receiving apparatus 2 of its own to control the velocity and attitude and also supplies the velocity and attitude data to the docking apparatus 73 and transmitting apparatus 1 of its own.

Figure 11:
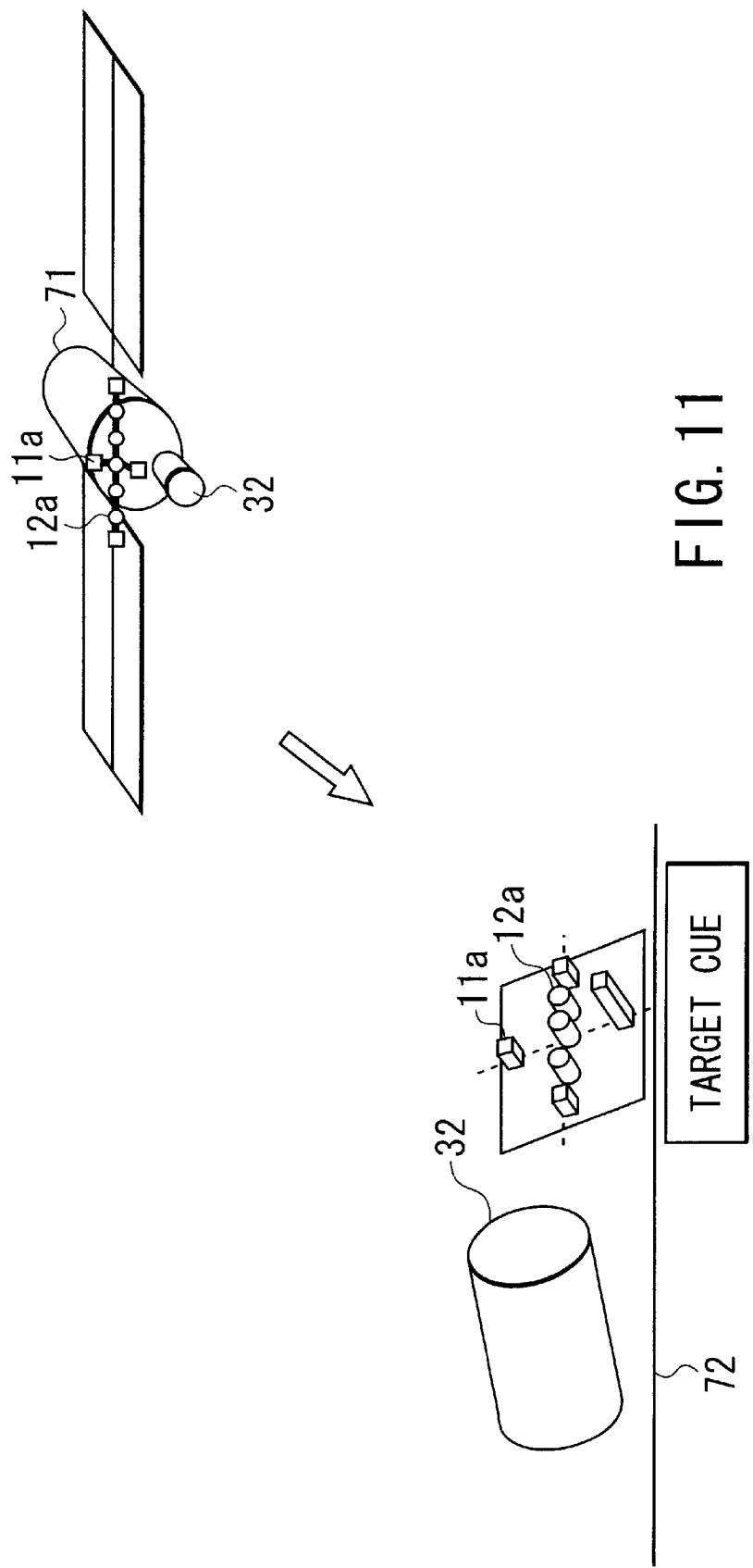
FIG. 11 is a view showing the states of a base station and artificial satellite to be docked.

In the moving body docking assist system with the above arrangement, the docking command apparatus 75 of the base station 72 notifies the velocity & attitude control apparatus 74 of the artificial satellite 71 of various commands and base station position through the transmitting apparatus 1 and receiving apparatus 2. On the basis of this notification, the velocity & attitude control apparatus 74 controls the velocity and attitude of the artificial satellite 71. The base station 72 is notified of the control result through the transmitting apparatus 1 and receiving apparatus 2. The docking apparatuses 73 on both sides monitor the velocity and attitude of the artificial satellite 71 and the position of the base station on the basis of notification from the receiving apparatuses 2 of their own, and activate the units at predetermined timings, thereby executing docking. FIG. 11 shows the states of the base station and artificial satellite to be docked.

As described above, since the moving body docking assist system according to the fourth embodiment of the present invention has the transmitting apparatus 1 and receiving apparatus 2, a docking assist system for an artificial satellite exposed to strong electromagnetic waves can be implemented.

Fifth Embodiment

Figure 12:
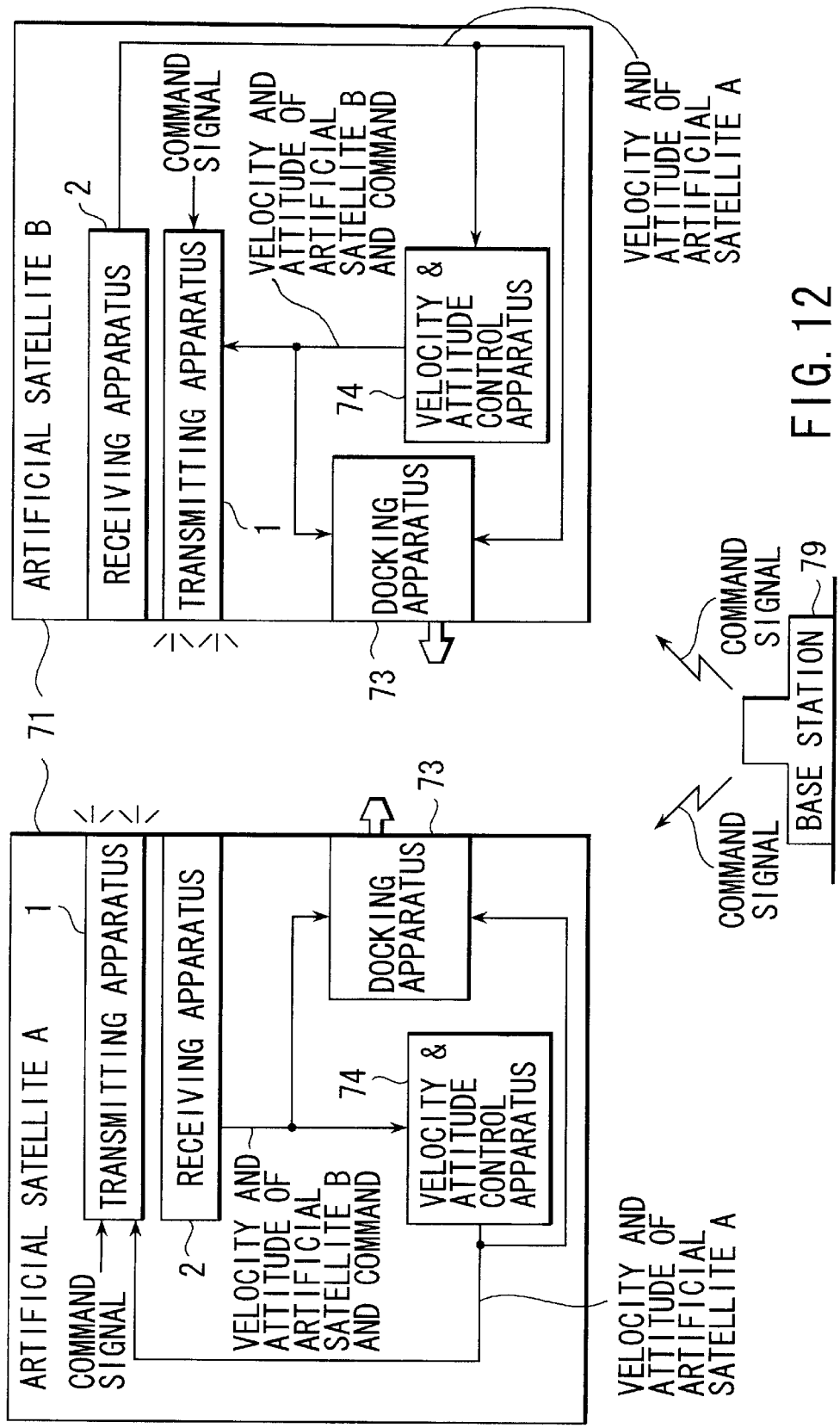
FIG. 12 is a block diagram showing the arrangement of a moving body docking assist system according to the fifth embodiment of the present invention.

FIG. 12 is a block diagram showing the arrangement of a moving body docking assist system according to the fifth embodiment of the present invention. In this embodiment, the system of the first or second embodiment is used for an artificial satellite docking assist system, as in the fourth embodiment. In this embodiment, an artificial satellite docking assist system for docking artificial satellites to each other will be described.

This moving body docking assist system is constructed as a docking assist system for docking artificial satellites to each other and incorporated in artificial satellites 71A and 71B. Each of the artificial satellites 71A and 71B has the same arrangement as in the fourth embodiment. However, if the artificial satellites 71A and 71B mutually notify themselves of their velocities and attitudes and control the velocities and attitudes on the basis of these data, the relative positions never converge, and docking is impossible. To avoid this, one artificial satellite serves as a master unit, and the other serves as a slave unit: a ground base station 79 sends a command signal to make one artificial satellite take the initiative and operate as the base station 72 of the fourth embodiment. After receiving the command signal from the ground base station 79, the same state as in the fourth embodiment is obtained under predetermined conditions.

This command can be given in various situations. For example, after the two satellites 71A and 71B come close to a predetermined distance or less, the master/slave state may be set. The master artificial satellite may be determined in advance on the basis of a predetermined relationship regardless of the command from the ground base station. In a certain situation, one of the artificial satellites 71A and 71B need only position detection and data communication. As various cases are possible, each of the artificial satellites 71A and 71B includes both a transmitting apparatus 1 and receiving apparatus 2 to enable any combination. FIGS. 13A and 13B are views showing the states of the two artificial satellites 71A and 71B before and after docking.

As described above, since the moving body docking assist system according to the fifth embodiment of the present invention has the transmitting apparatus 1 and receiving apparatus 2, a docking assist system for docking artificial satellites to each other, which optically transmits velocity data while detecting the position of an artificial satellite to be docked on an image can be implemented.

The present invention is not limited to the above embodiments, and various changes and modifications can be made without departing from the spirit and scope of the invention. The embodiments can be appropriately possibly combined. In this case, a combined effect can be obtained.

For example, in the fourth and fifth embodiments, docking of an artificial satellite has been exemplified. However, the present invention can be applied not only to an artificial satellite but also to various kinds of outerspace moving bodies or outerspace installed bodies, including spacecraft and space stations. An outerspace moving body or outerspace installed body having the transmitting apparatus 1 and receiving apparatus 2 can perform communication and position detection even in an outerspace zone where radio wave communication is impossible because of particularly heavy radio wave fault. In this case, when the apparatus is equipped with glass lasers or gas lasers with high output power as the light-emitting elements 11a and 12a, the effective communication range can be made long.

[Experiment 1]

An experiment associated with position detection according to the present invention was conducted. A system for this experiment included at least position detection infrared LEDs, data communication infrared LEDs, A/D converter, CCD camera, and infrared filter as a prototype of the system described in the embodiments.

In this experimental apparatus, an image sensing element was fixed at one end of an optical experimental rail, and an X-Y-Z stage and rotating stage were attached to the other end, on which an object having light-emitting elements was placed. This allowed the object to freely rotate and move in the vertical, horizontal, and back-and-forth directions. In Experiment 1, infrared LEDs were used as the light-emitting elements, and a CCD camera was used as the image sensing element. An infrared pass filter was attached to the camera to sense only LED light.

In position detection, four infrared LEDs attached to the object were sensed with the CCD camera through the infrared filter. The gravitational center position of each element was obtained from the sensed image, and the position of the object was calculated in real time using triangulation.

First, measurement errors were evaluated in relation to translation along the optical axis (Z-axis) of the CCD camera. The object was placed at a position separated from the camera by z, and the error between the actual position and the position detection result at that position was obtained (z was changed from 0.30 m to 0.85 m in 0.05 m increments).

FIGS. 14A to 14E are views showing the form and result of the experiment related to position detection. FIG. 14A shows the coordinates on the measurement system. FIG. 14B shows the measurement errors in distance z between the CCD camera and the light-emitting element. Referring to FIG. 14B, the abscissa z in FIG. 14B represents the distance z from the camera to the object, and the ordinate represents the error between the actual position and the position detection result. FIGS. 14C to 14E show measurement errors when the object was move relative to the optical axis on the X-Y plane while the distance z was constant.

As is apparent from FIG. 14B, the error becomes large in proportion to the distance between the camera and the object. A large error was measured when the distance from the camera was 0.30 m, 0.55 m, and 0.75 m. This is probably caused by a quantization error generated upon converting the sensed image into pixel data. However, the error was 10 mm or less, perhaps within the allowable range in the system to be implemented.

Next, measurement errors generated when the object was moved in a direction (X- and Y-axes) perpendicular to the optical axis were evaluated. The result is shown in FIGS. 14C to 14E.

FIGS. 14C to 14E show errors when the distance from the camera to the object is 0.30 m, 0.50 m, and 0.80 m, respectively. Referring to FIGS. 14C to 14E, the abscissa represents the distance from the optical axis in the X-direction, and the ordinate represents the distance from the optical axis in the Y-direction. The hatching pitch in FIGS. 14C to 14E represents the magnitude of error (the smaller the hatching pitch becomes, the larger the error is). As is apparent from FIGS. 14C to 14E, in any case, the error was almost zero near the optical axis, though it became large as the distance from the optical axis became large. However, the error was 4 mm or less.

[Experiment 2]

An experiment associated with data communication according to the present invention was conducted. In Experiment 2 as well, infrared LEDs were used as light-emitting elements, and a CCD camera was used as an image sensing element. An infrared pass filter was attached to the camera to sense only LED light. In the experimental apparatus used herein, 12 infrared LEDs were attached to an object as light sources for data transmission. Since each LED corresponded to one bit of transmission data, this apparatus could send data at a rate of 360 (bit/sec).

Figure 15A:
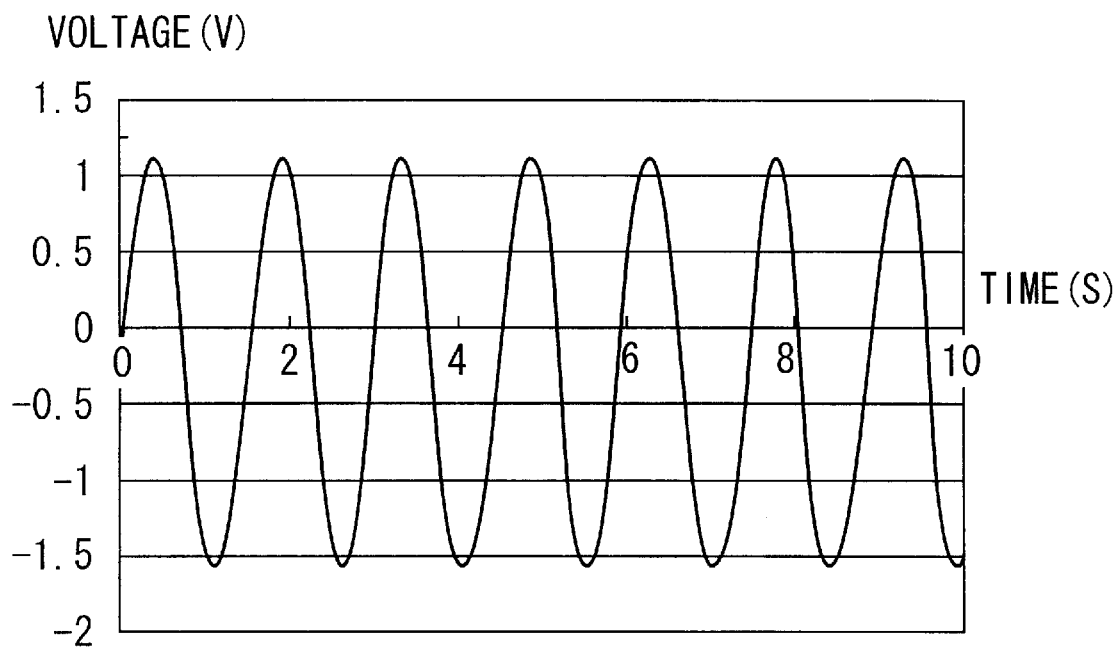
FIGS. 15A and 15B are graphs showing examples of signals transmitted/received in an experiment related to data communication.
Figure 15B:
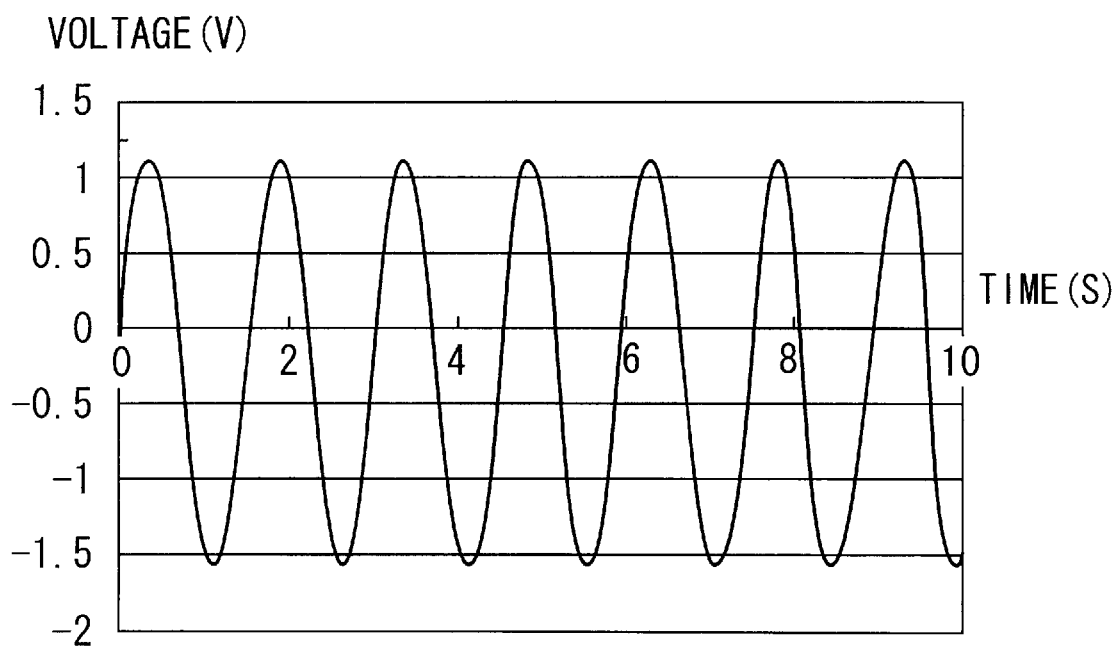

FIGS. 15A and 15B are graphs showing examples of signals transmitted/received in the experiment related to data communication. As shown in FIG. 15A, the signal supplied to the transmitting side was a sine wave having an amplitude of 1.4V, frequency of 0.6 Hz, and bias voltage of −0.2V. The distance from the camera to the object was 0.80 m. In the reception signal shown in FIG. 15B, the original data was almost accurately transmitted, though slight distortion was observed.

[Experiment 3]

An experiment related to a system for simultaneously executing position detection and data communication according to the present invention was conducted.

Figures 16A, 16B:
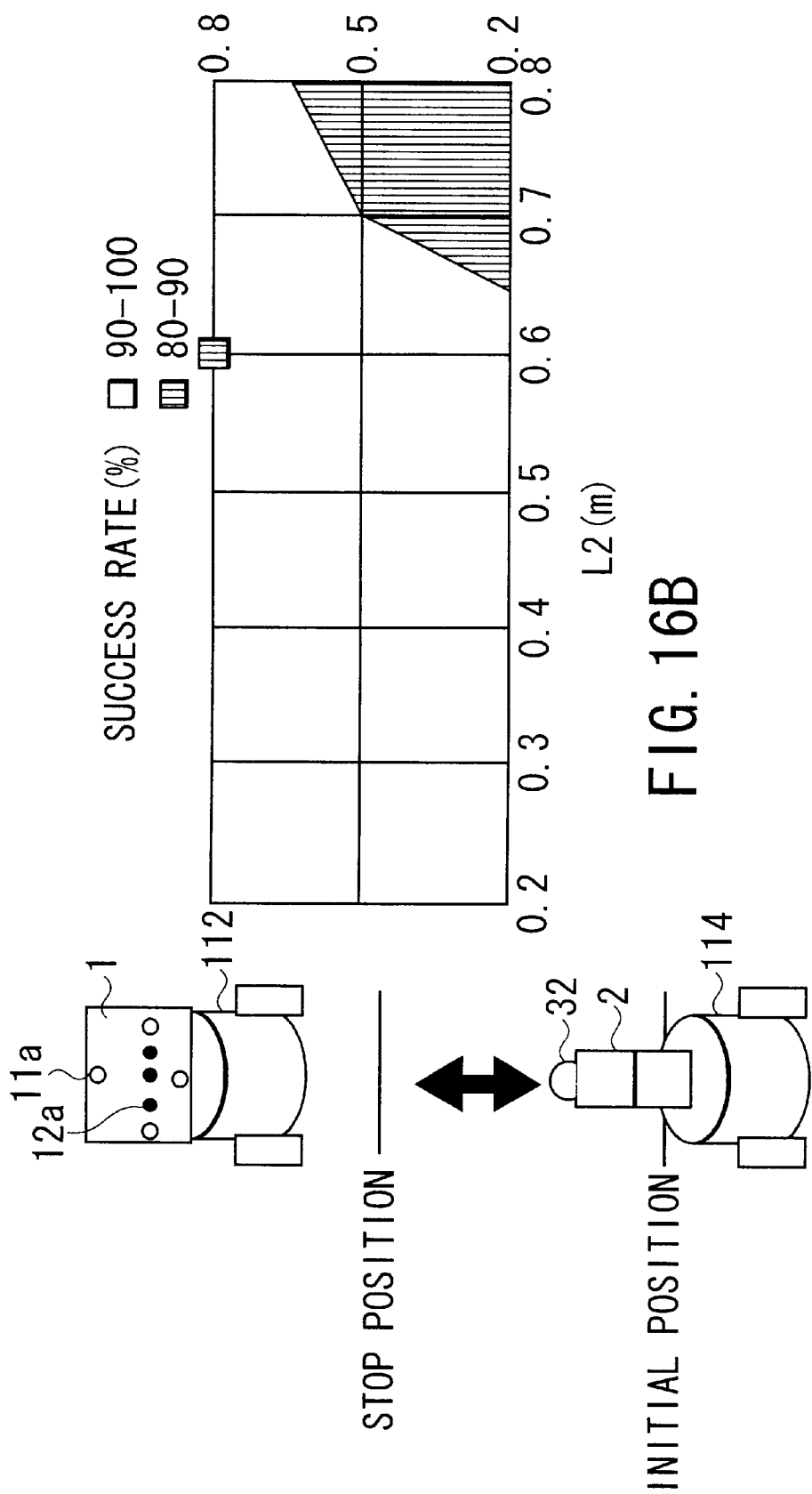
FIGS. 16A and 16B are views showing the form and result of an experiment related to a system for simultaneously executing position detection and data communication.

As shown in FIG. 16A, two free-running robots 112 and 114 were prepared. The robots 112 and 114 had a transmitting apparatus 1 and receiving apparatus 2 according to the second embodiment, respectively. The second robot 114 having the receiving apparatus 2 was made to oppose the first robot 112 having the transmitting apparatus 1 while being spaced apart by an initial distance (initial position) L1. More specifically, the optical axis of an image sensing element 32 of the receiving apparatus 2 was set perpendicular to a support panel having light-emitting elements 11a and 12a of the transmitting apparatus 1. The position of the first robot 112 was indicated by the light-emitting elements 11a of the transmitting apparatus 1. Simultaneously, a command "move to a stop distance (stop position) L2" is transmitted from the light-emitting elements 12a to the receiving apparatus 2 to start the second robot 114 having the receiving apparatus 2.

The initial distance L1 was changed from 0.2 m to 0.8 m in 0.3 m increments. The stop distance L2 was changed from 0.2 m to 0.8 m in 0.1 m increments. Assuming that the command was successfully executed when the error in stop distance L2 was ±10 mm, the success rate=[success count]/10 in 10-time trial was calculated. FIG. 16B is a graph showing the result of this experiment. As shown in FIG. 16B, when the stop distance L2 was large, the success rate slightly lowered, though a success rate of 80% to 100% was obtained in the full range of experiment condition.

Figure 17B:
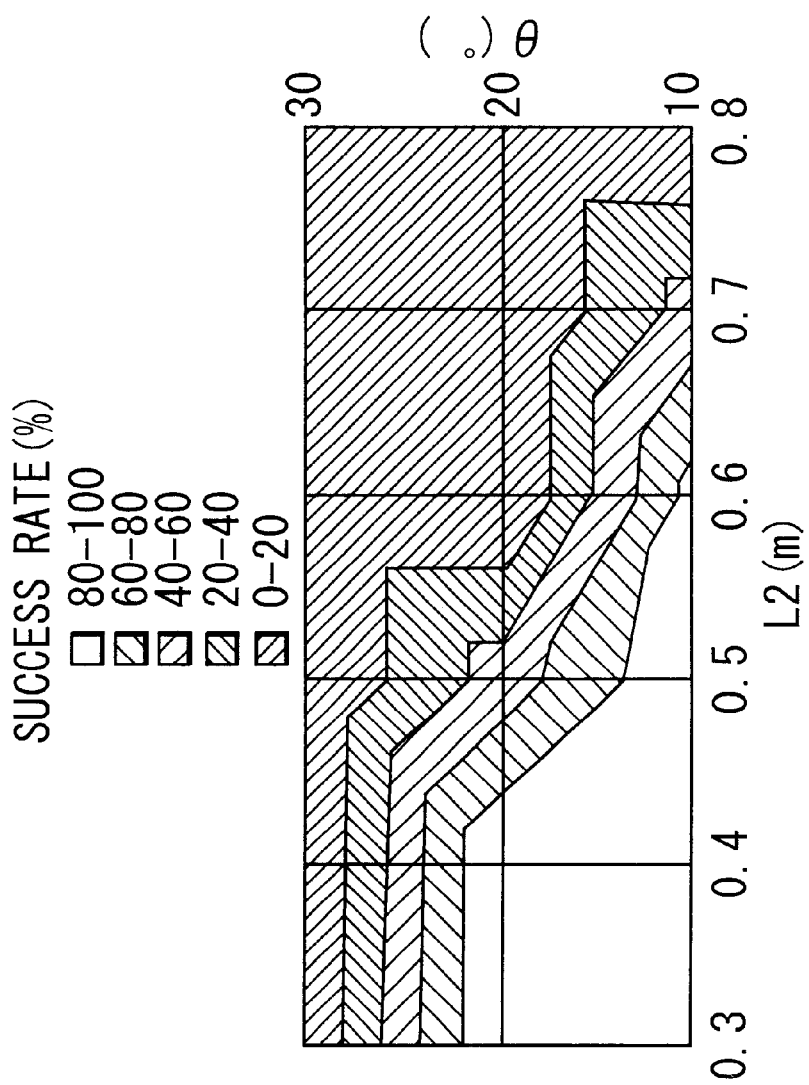
FIGS. 17A and 17B are views showing the form and result of another experiment related to a system for simultaneously executing position detection and data communication.
Figure 17A:
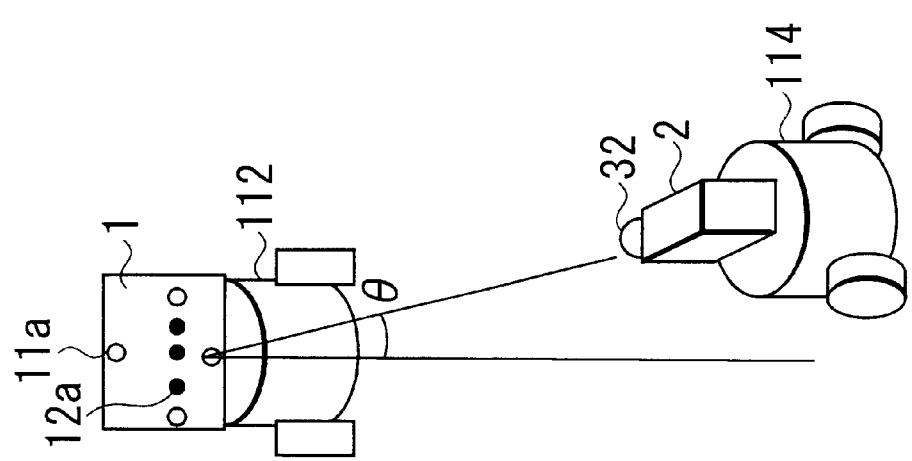

Next, as shown in FIG. 17A, the first and second robots 112 and 114 respectively including the transmitting apparatus 1 and receiving apparatus 2 were made to oppose each other at an angle. More specifically, the optical axis of the image sensing element 32 of the receiving apparatus 2 makes an angle θ with the support panel having the light-emitting elements 11a and 12a of the transmitting apparatus 1. The position of the first robot 112 was indicated by the light-emitting elements 11a of the transmitting apparatus 1. Simultaneously, a command "move to a stop distance (stop position) L2" is transmitted from the light-emitting elements 12a to the receiving apparatus 2 to start the second robot 114 having the receiving apparatus 2.

The initial distance L1 was fixed to 0.2 m. The tilt angle θ was changed for three steps of 10°, 20°, and 30°. The stop distance L2 was changed from 0.3 m to 0.8 m in 0.1 m increments. Assuming that the command was successfully executed when the error in stop distance L2 was ±10 mm, the success rate=[success count]/10 in 10-time trial was calculated. FIG. 17B is a graph showing the result of this experiment. As is apparent from FIG. 17B, the larger the tilt angle θ and stop distance L2 became, the lower the success rate became.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmitting apparatus comprising:
   a support member;
   a position indicating section having a plurality of first light-emitting elements supported by said support member, said first light-emitting elements being turned on to indicate a position of said transmitting apparatus; and
   a data transmitting section having a second light-emitting element supported by said support member, said second light-emitting element blinking in correspondence with data to transmit the data.

2. The apparatus according to claim 1, further comprising a data processing section for supplying different kinds of information to said data transmitting section as the data.

3. The apparatus according to claim 2, further comprising a sensor for acquiring information associated with a target measurement object and supplying the information to said data processing section as the data.

4. The apparatus according to claim 3, wherein the target measurement object is movable, and said support member is attached to the target measurement object.

5. The apparatus according to claim 1, wherein said data transmitting section comprises second light-emitting elements in a number corresponding to the number of bits of the data.

6. The apparatus according to claim 1, wherein said plurality of first light-emitting elements comprise four light-emitting elements spaced apart from each other at an interval and located at apexes of a rectangle, and one of said four light-emitting elements is laid out not on a plane defined by three remaining light-emitting elements.

7. The apparatus according to claim 1, wherein said second light-emitting element and each of said first light-emitting elements emit light components having different wavelengths.

8. The apparatus according to claim 1, wherein said first light-emitting elements form a plurality of groups, said groups emitting light components having different wavelengths.

9. The apparatus according to claim 1, wherein said second light-emitting element and each of said first light-emitting elements are exclusively used for data transmission and position indication, respectively.

10. A receiving apparatus for detecting the position of said transmitting apparatus of claim 1 and receiving the data transmitted from said transmitting apparatus, comprising:
an image sensing element for sensing said first and second light-emitting elements;
an image processing section for separately extracting image components of said first and second light-emitting elements from a sensed image obtained by said image sensing element;
a position detecting section for detecting the position of said transmitting apparatus on the basis of the image components of said first light-emitting elements extracted by said image processing section; and
a data detecting section for detecting the data on the basis of the image component of said second light-emitting element extracted by said image processing section.

11. The apparatus according to claim 10, further comprising an A/D (analog/digital) converter for A/D-converting the sensed image obtained by said image sensing element to form a digital image.

12. The apparatus according to claim 10, wherein said first light-emitting elements are laid out around said second light-emitting element, and said image processing section is configured to first scan the sensed image from an outer side to extract only the image components of said first light-emitting elements and then, on the basis of a predetermined positional relationship between said first and second light-emitting elements, scan only a region near an estimated position of said second light-emitting element on the sensed image to extract the image component of said second light-emitting element.

13. The apparatus according to claim 10, wherein said image sensing element senses said first and second light-emitting elements as a color image, and said image processing section processes the color image.

14. A system for performing position detection and data communication, comprising:
(a) a transmitting apparatus,
said transmitting apparatus comprising
a support member,
a position indicating section having a plurality of first light-emitting elements supported by said support member, said first light-emitting elements being turned on to indicate a position of said transmitting apparatus; and
a data transmitting section having a second light-emitting element supported by said support member, said second light-emitting element blinking in correspondence with data to transmit the data, and
(b) a receiving apparatus,
said receiving apparatus comprising
an image sensing element for sensing said first and second light-emitting elements;
an image processing section for separately extracting image components of said first and second light-emitting elements from a sensed image obtained by said image sensing element;
a position detecting section for detecting the position of said transmitting apparatus on the basis of the image components of said first light-emitting elements extracted by said image processing section; and
a data detecting section for detecting the data on the basis of the image component of said second light-emitting element extracted by said image processing section.

15. The system according to claim 14, wherein said transmitting apparatus and said receiving apparatus are arranged in one and the other of two moving bodies, respectively, or in each of the two moving bodies.

16. The system according to claim 14, wherein said transmitting apparatus and said receiving apparatus are arranged in one and the other of a stationary body and a moving body, respectively, or in each of the stationary body and the moving body.

17. The system according to claim 14, wherein said system is used as a hospital monitoring system, said transmitting apparatus is attached to a patient who moves in a hospital while said image sensing element of said receiving apparatus is arranged in the hospital, and said transmitting apparatus further comprises a data processing section for supplying different kinds of information to said data transmitting section as the data, and a sensor for acquiring information associated with a state of the patient and supplying the information to said data processing section as the data.

18. The system according to claim 14, wherein said system is used as a docking assist system for docking a moving body to a stationary body, and said transmitting apparatus and said receiving apparatus are arranged in one and the other of the stationary body and the moving body, respectively.

19. The system according to claim 18, wherein said transmitting apparatus is arranged in the stationary body, said receiving apparatus is arranged in the moving body, and the data comprises data for docking.

20. The system according to claim 14, wherein said system is used as a docking assist system for docking first and second moving bodies to each other, and said transmitting apparatus and said receiving apparatus are arranged in the first moving body while a transmitting apparatus and receiving apparatus substantially equivalent to said transmitting apparatus and said receiving apparatus are arranged in the second moving body.

* * * * *

UNITED STATES PATENT AND TRADEMARK OFFICE
CERTIFICATE OF CORRECTION

PATENT NO. : 6,603,865 B1
DATED : August 5, 2003
INVENTOR(S) : Yagi et al.

It is certified that error appears in the above-identified patent and that said Letters Patent is hereby corrected as shown below:

<u>Title page,</u>
Item [30], Foreign Application Priority Data should read as follows:

-- [30]     Foreign Application Priority Data

Jan. 27, 2000      (JP) …………………...2000-018704 --

Signed and Sealed this

Twenty-fifth Day of November, 2003

JAMES E. ROGAN
*Director of the United States Patent and Trademark Office*